US010812678B2

United States Patent
Omori et al.

(10) Patent No.: US 10,812,678 B2
(45) Date of Patent: Oct. 20, 2020

(54) IMAGE PROCESSING DEVICE, IMAGING APPARATUS, IMAGE PRINTING APPARATUS, CONTROL METHOD OF IMAGE PROCESSING DEVICE, AND IMAGE PROCESSING PROGRAM FOR PERFORMING CORRECTION PROCESSING ON IMAGE

(71) Applicant: SHARP KABUSHIKI KAISHA, Sakai, Osaka (JP)

(72) Inventors: Keisuke Omori, Osaka (JP); Kei Tokui, Osaka (JP); Shinichi Arita, Osaka (JP); Daisuke Murayama, Osaka (JP); Takayuki Tamaru, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/473,483

(22) PCT Filed: Nov. 2, 2017

(86) PCT No.: PCT/JP2017/039776
§ 371 (c)(1),
(2) Date: Jun. 25, 2019

(87) PCT Pub. No.: WO2018/123265
PCT Pub. Date: Jul. 5, 2018

(65) Prior Publication Data
US 2020/0007710 A1  Jan. 2, 2020

(30) Foreign Application Priority Data

Dec. 27, 2016  (JP) ................. 2016-253887

(51) Int. Cl.
*H04N 1/393* (2006.01)
*H04N 1/00* (2006.01)

(52) U.S. Cl.
CPC ......... *H04N 1/393* (2013.01); *H04N 1/00167* (2013.01); *H04N 1/00188* (2013.01); *H04N 1/00251* (2013.01)

(58) Field of Classification Search
None
See application file for complete search history.

(56) References Cited

U.S. PATENT DOCUMENTS

H000997 H * 11/1991 Bronson ................. 345/418
8,218,895 B1 * 7/2012 Gleicher ............ G06T 3/0025
345/427

(Continued)

FOREIGN PATENT DOCUMENTS

JP  2007-074664 A  3/2007
JP  2008-225465 A  9/2008

(Continued)

*Primary Examiner* — Thomas D Lee
(74) *Attorney, Agent, or Firm* — ScienBiziP, P.C.

(57) ABSTRACT

Image quality degradation of an output image can be reduced. A control unit includes a correction intensity determination unit that determines a first magnification for reducing a reduction region including a subject and a second magnification for enlarging an enlargement region and an image correction unit that corrects an input image by using the first magnification and the second magnification. The correction intensity determination unit determines the first magnification based on the second magnification and the widths of a first region and a second region in the input image.

12 Claims, 14 Drawing Sheets

(56) References Cited

U.S. PATENT DOCUMENTS

| | | | |
|---|---|---|---|
| 2003/0006995 A1* | 1/2003 | Smith | G06F 3/0481 |
| | | | 345/671 |
| 2005/0157344 A1* | 7/2005 | Nagashima | G06T 11/60 |
| | | | 358/1.18 |
| 2009/0237679 A1 | 9/2009 | Usui | |
| 2009/0245650 A1 | 10/2009 | Shingai | |
| 2010/0054620 A1* | 3/2010 | Kobayashi | G06T 3/0093 |
| | | | 382/256 |

FOREIGN PATENT DOCUMENTS

| JP | 2009-232246 A | 10/2009 |
|---|---|---|
| JP | 2009-251635 A | 10/2009 |
| JP | 2009-253323 A | 10/2009 |

\* cited by examiner

IMAGE PROCESSING DEVICE, IMAGING APPARATUS, IMAGE PRINTING APPARATUS, CONTROL METHOD OF IMAGE PROCESSING DEVICE, AND IMAGE PROCESSING PROGRAM FOR PERFORMING CORRECTION PROCESSING ON IMAGE

TECHNICAL FIELD

The following disclosure relates to an image processing device that performs predetermined correction processing on an image.

BACKGROUND ART

A technology for changing the impression of a subject included in an image by enlarging and/or reducing a part of the image by image processing has been known. With this technique, for example, the image is corrected so as to make the face of a person (subject) included in the image smaller, so that the viewer (including the person) is given the impression that the subject has a small face. For example, by correcting the image so that the whole body of the person included in the image becomes thin, the impression of a subject with a thin (slim) physique can be provided to the viewer. For example, by correcting the image so that the legs of the person included in the image become long, the person appears to have a good physique from the perspective of the viewer.

As a technique for correcting the face of a person included in the image to be small, a technique described in, for example, PTL1 is provided. The image processing device disclosed in PTL 1 extracts a face region of a person in an image, identifies a region including the face region to be a reduction region, and identifies regions other than the reduction region as an enlargement region. The image processing device reduces the reduction region by using a predetermined reduction ratio, calculates an enlargement ratio based on a ratio between the enlargement region and the reduction region, and enlarges the enlargement region by using the enlargement ratio. Thus, the image can be corrected with the aspect ratio of the image maintained before and after the correction.

CITATION LIST

Patent Literature

PTL 1: JP 2009-251635 A (published on Oct. 29, 2009)

SUMMARY OF INVENTION

Technical Problem

However, the image processing device disclosed in PTL1 (hereinafter, referred to as a conventional image processing device) has the following disadvantage. The disadvantage is described below with reference to FIGS. 14(a) and 14(b). FIGS. 14(a) and 14(b) are diagrams illustrating a disadvantage of image correction processing executed by the conventional image processing device, and includes FIG. 14(a) illustrating an example of an image before the correction and lid 14(b) illustrating an example of an image after the correction.

As illustrated in FIG. 14(a), a pre-correction image Ib101 includes an image of a face Sub of a person as a subject. The conventional image processing device sets a region including the face Sub and having a width W101 as a reduction region Ar101, and sets regions that are each outside the reduction region Ar101 and have a width W102 as enlargement regions Ar102. A ratio between the reduction region Ar101 and the enlargement regions Ar102 in the image Ib101 (that is, width W101:2×width W102) is assumed to be 0.8:0.2. The reduction region Ar101 is reduced by a first magnification set in advance, which is assumed to be 0.9.

Under such a condition, a second magnification for enlarging the enlargement region Ar102 in the method employed by the conventional image processing device is calculated to be (1.0−0.9×0.8)/0.2=1.4. It is to be noted that 1.0 is a value as a result of normalizing the total width (width W101+2×width W102) of the reduction region Ar101 and the enlargement regions Ar102 in the image Ib101.

FIG. 14(b) illustrates an image Ia101 generated as a result of correcting the image Ib101 with the first magnification and the second magnification. The reduction region Ar101 is reduced with the first magnification to be a width W101a (<width W101). As a result, comparison between the pre-correction image Ib101 and the post-correction image Ia101 indicates that the face Sub in the image Ia101 is reduced to be thinner than that in the image Ib101. The enlargement region Ar102 is enlarged with the second magnification to have a width W102a (>width W102) to be largely enlarged in a lateral direction (±x axis direction).

With the method performed by the conventional image processing device, a smaller enlargement region Ar102 relative to the reduction region Ar101 results in the second magnification with a large value, as can be seen in the image Ib101 in FIG. 14(a). In other words, with the method, a smaller enlargement region Ar102 relative to the reduction region Ar101 results in the second magnification calculated to be a larger value. Thus, a smaller enlargement region Ar102 relative to the reduction region Ar101 will be more largely enlarged in the post-correction image Ia101. Thus, the method might result in the post-correction image Ia101 generated as an unnatural image. In other words, the image quality of the post-correction image Ia101 might be degraded.

An object of one aspect of the present disclosure is to provide an image processing device that can prevent the image quality font degrading as a result of the image processing.

Solution to Problem

An image processing device according to an aspect of the present disclosure for solving the problem described above includes:
 a target region detection unit that detects a target region in an image;
 a magnification determination unit that determines a first magnification for reducing a first region including the target region in the image and a second magnification for enlarging a second region on an outer side of the first region, and
 an image correction unit that reduces the first region by using the first magnification and enlarges the second region by using the second magnification to correct the image, wherein
 the magnification determination unit determines the first magnification based on the second magnification and widths of the first region and the second region in the image.

An image processing device according to an aspect of the present disclosure for solving the problem described above includes:

a target region defection unit that detects a target region in an image;

a magnification determination unit that determines a first magnification for reducing a first region including the target region in the image; and an image correction unit that reduces the first region by using the first magnification and enlarges a second region on an outer side of the first region by using a predetermined second magnification for enlarging the second region, wherein the magnification determination unit determines the first magnification based on the widths of the first region and the second region in the image.

A control method of an image processing device according to an aspect of the present disclosure for solving the problem described above is a method comprising:

a target region detection step of detecting a target region in an image;

a magnification determination step of determining a first magnification for reducing a first region including the target region in the image and a second magnification for enlarging a second region on an outer side of the first region; and an image correction step of reducing the first region by using the first magnification and enlarges the second region by using the second magnification to correct the image, wherein the magnification determination step includes determining the first magnification based on the second magnification and widths of the first region and the second region in the image.

Advantageous Effects of Invention

With an image processing device and a method of controlling the same according to one aspect of the present disclosure can prevent the image quality from degrading in an image after being processed.

DESCRIPTION OF EMBODIMENTS

First Embodiment

A first embodiment of the present invention will be described below in detail with reference to FIG. 1 to FIG. 7.

Configuration of Image Printing Apparatus

Figure 1:
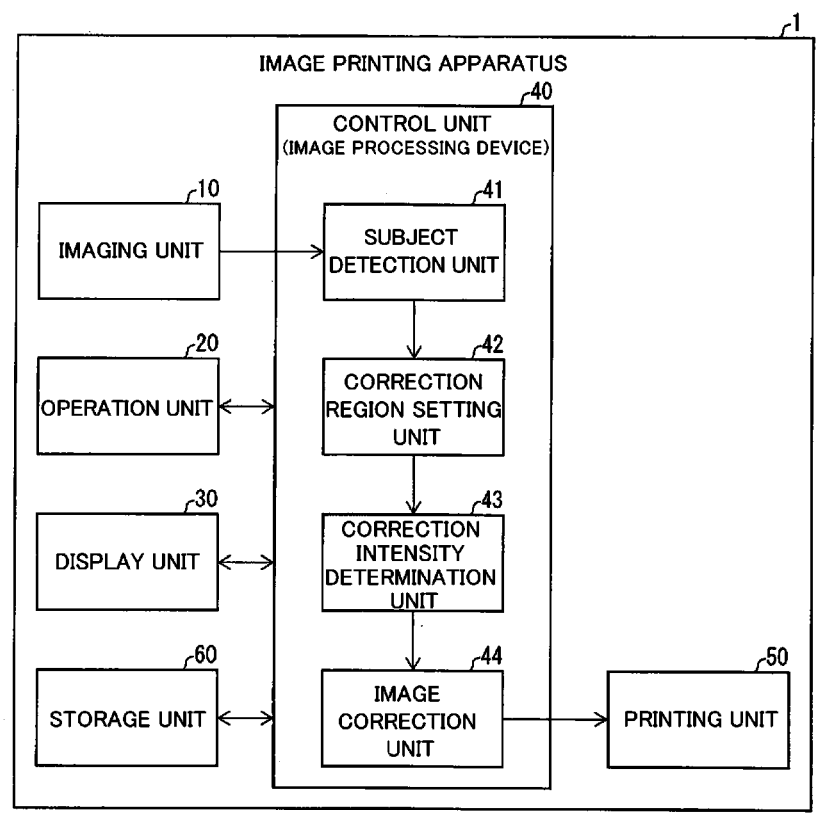
FIG. 1 is a functional block diagram illustrating a configuration of an image printing apparatus according to a first embodiment of the present invention.

An example of a configuration of an image priming apparatus 1 (imaging apparatus) is described based on FIG. 1. FIG. 1 is a functional block diagram illustrating a configuration of the image printing apparatus 1 of the present embodiment. As illustrated in FIG. 1, the image printing apparatus 1 includes an imaging unit 10, an operation unit 20, a display unit 30, a control unit 40 (image processing device), a printing unit 50, and a storage unit 60. The imaging unit 10 and the control unit 40 function as the imaging apparatus.

The imaging unit 10 captures an image of a subject and transmits the captured image (an image including a target region including the subject) to the control unit 40 as an input image. The target region is a region to be a target of reduction and enlargement processing executed by the control unit 40.

The operation unit 20 receives an input from a user, and is implemented by a touch panel and a mouse for example. For example, when the operation unit 20 is a touch panel, the input image is displayed on the display unit 30 including the touch panel.

The display unit 30 displays various images. For example, the display unit 30 displays the image captured by the imaging unit 10 or an output image generated by the image correction unit 44 as described later.

The control unit 40 entirely controls the image printing apparatus 1. The control unit 40 executes image processing on the image (input image) captured by the imaging unit 10, and functions as an image processing device that generates the output image as a result of the processing (correction). A specific configuration of the control unit 40 will be described in detail later.

The printing unit 50 prints the output image (image) generated by the processing executed by the control unit 40. The printing unit 50 may also print an image drawn by the user using the operation unit 20.

The storage unit 60 stores various programs executed by the control unit 40 and the like, and includes hard disk and a nonvolatile storage device such as a flash memory. The storage unit 60 stores the input image and the output image for example. The storage unit 60 may further store parameters and the like required for the processing executed by the control unit 40 such as image processing (correction processing) and subject detection processing.

The image priming apparatus 1 may not necessarily include the control unit 40 that functions as the image processing device. For example, an external apparatus that can be in communicable connection with the image printing apparatus 1 can have the image processing function of the control unit 40.

The image printing apparatus 1 may not necessarily include the imaging apparatus including the imaging unit 10 and the control unit 40 that functions as the image processing device. In such a case, the imaging apparatus may function as the external apparatus that can be in communicable connection with the image printing apparatus 1 or may not have the function. The image printing apparatus 1 may not include the imaging unit 10. In such a case, the imaging unit 10 functions as the external apparatus that can be in communicable connection with the image printing apparatus 1.

Configuration of Control Unit

Next, the specific configuration of the control unit 40 is described based on FIG. 1. The control unit 40 includes a subject detection unit (target region detection unit) 41, a correction region setting unit 42, a correction intensity determination unit 43 (magnification determination unit), and an image correction unit 44, to execute the function of the image processing device.

The subject detection unit 41 detects a subject (target region) as a correction target in the input image input to the control unit 40. The subject detected by the subject detection unit 41 includes (1) a person, (2) a person's face, (3) various pans of the face such as an eye, the mouth, or the nose, and (4) the face line of the face. When detecting a face, the subject detection unit 41 can detect the subject using existing technologies such as using information about a skin color area detected from the input image, for example.

The subject detection by the subject detection unit 41 may be manually performed. In other words, the user may detect a subject from the input image. In such a case, for example, the subject detection unit 41 (subject selection unit) causes the display unit 30 to display the input image, and detects (selects) a subject designated by the user input through the operation unit 20 as the subject as the correction target. The subject detection unit 41 selects the subject to be the correction target based on the user input when the input image includes a plurality of subjects.

For example, when the operation unit 20 is a touch panel, a subject in the input image displayed by the display unit 30 is selected through a touching operation on the touch panel. When the operation unit 20 is a mouse, the subject is selected based on a mouse operation.

The description in this specification is given assuming that correction processing is executed on an image (that is, an image including a subject) captured by the imaging unit 10. Specifically, reduction and enlargement processing are executed on the subject in the image. However, this should not be construed in a limiting sense, and the image to be the correction target may not be an image captured by the imaging unit 10. In such a case, the subject detection unit 41 detects a target subject to be the correction target (that is, a target region including the target subject) in an image. Thus, the subject detection unit 41 functions as a target region detection unit that detects a subject in an image or a target region (that is, a target region in the image) including a target object other than the subject.

The correction region setting unit 42 sets the correction region to be the correction target in the input image, based on information about the subject (information about the position and the size of the subject for example) detected by the subject detection unit 41. The correction region setting unit 42 sets the region including the subject in the input image as the reduction region (first region) in the input image. The correction region setting unit 42 sets a region outside the set reduction region, more specifically, a region adjacent to the reduction region, as an enlargement region (second region) in the input image. In other words, the correction region setting unit 42 sets the reduction region and the enlargement region as the correction regions.

For example, when correction to make a person's face as the subject smaller is performed, the correction region setting unit 42 sets a region including the detected face as the reduction region, and sets a region outside of such a region as the enlargement region. The details of the reduction region and the enlargement region to be set are described later in detail.

The correction intensity determination unit 43 determines a first magnification ($<1$) and a second magnification ($>1$) respectively for reducing the reduction region and for enlarging the enlargement region set by the correction region setting unit 42 in the input image. In other words, the correction intensity determination unit 43 determines the first magnification and the second magnification as correction intensities indicating the levels of correction on the correction regions.

The correction intensity determination unit 43 determines the first magnification based on the second magnification and the widths of the reduction region and the enlargement region in the input image. Specifically, the correction intensity determination unit 43 obtains the first magnification from {1−(second magnification)×(ratio of width of second region in a predetermined direction from a predetermined position in the reduction region to a reference width from the predetermined position in the reduction region to an end portion of the enlargement region)}/(a ratio of the width, of the first region from the predetermined position in the predetermined direction to the reference width).

In the present embodiment, a value of the second magnification set in advance is directly used. The first magnification obtained as described above may be determined through calculation in accordance with the second magnification set in advance and the widths, based on the position and the size of the subject in the input image, for example.

Furthermore, "1" in the formula described above is a value obtained by normalizing the reference width. The predetermined position, which defines the reference width, may be arbitrary set as long as the first magnification can be obtained to achieve appropriate correction in the output image (correction resulting in no unnaturalness). For example, in the present embodiment, the predetermined position is a center line (correction center line) CL of the reduction region Ar1 illustrated in FIG. 2 and FIG. 3, and the reference width Wb is a sum of the width W1 of the reduction region Ar1 and the width W2 of the enlargement region Ar2 (Wb=W1+W2) on the left side of the center line CL.

Specifically, for example, when the position of the subject is close to an end portion (image end) of the input image, the width of the enlargement region set by the correction region setting unit 42 may vary among positions in the enlargement region, or may be relatively small depending on a position. When the reduction region is reduced and the enlargement region is enlarged by using the first magnification and the second magnification set in advance under such a condition, an unnatural image might be generated. As described above, the first magnification set in advance is replaced with the first magnification calculated based on the second magnification and the widths of the reduction region and the enlargement region (thus, the first magnification is corrected), so that the suitable correction with the degradation of the image quality suppressed can be performed on the input image. How the first magnification is determined is described in detail later.

The correction intensity determination unit 43 may determine the values set in advance (set values) to be directly used as the first magnification and the second magnification, when the ratio between the width of the reduction region and the width of the enlargement region set based on the position and the size of the subject in the input image matches a ratio set in advance and does not vary among the positions in the input image. The correction intensity determination unit 43 may determine the second magnification based on a user input.

In other words, when the ratio between the width of the first region and the width of the second region in a predetermined direction matches the ratio set in advance, the correction intensity determination unit 43 may respectively determine the first magnification and the second magnification set in advance as a first magnification for reducing the reduction region on a straight line extended in the predetermined direction from the predetermined position and as a second magnification for enlarging the enlargement region on the straight line. In such a case, for example, the correction intensity determination unit 43 may determine whether the ratio between the width of the reduction region and the width of the enlargement region matches entirely over the regions, and the values set in advance may be determined as the first magnification and the second magnification, when the ratio entirely matches.

Note that the correction intensity determination unit 43 may uniformly determine the first magnification based on the second magnification and the widths of the reduction region and the enlargement region, regardless of the position and the size of the subject. Also in such a case, the value set in advance is used as the first magnification.

The image correction unit 44 corrects the input image by reducing the reduction region by using the first magnification determined by the correction intensity determination unit 43 and by enlarging the enlargement region by using the second magnification determined by the correction intensity determination unit 43. The image correction unit 44 outputs the image after correction to the printing unit 50 and/or the display unit 30 as the output image.

Details on how Reduction Region and Enlargement Region are Set and how First Magnification is Determined Next, how the reduction region and the enlargement region are set and how the first magnification is determined are described in detail based on FIG. 2 to FIG. 5. A case of thinning a person's face as the correction target subject through reduction in the lateral direction (x axis direction) is described in detail as an example.

In the present embodiment, a case is described as an example where the width W1 and the width W2 of the reduction region Ar1 and the enlargement region Ar2, set in advance in the input image, are the same (in other words, when the ratio between the width W1 and the width W2 of the reduction region Ar1 and the enlargement region Ar2 is width W1:width W2=0.5:0.5).

Case where Enlargement Regions have the Same Widths

First of all, the detail is described based on an example of image correction in a case where the face Sub of a person as the correction target is positioned far from the image end and has a size that is not very large relative to the input image.

Figure 2:
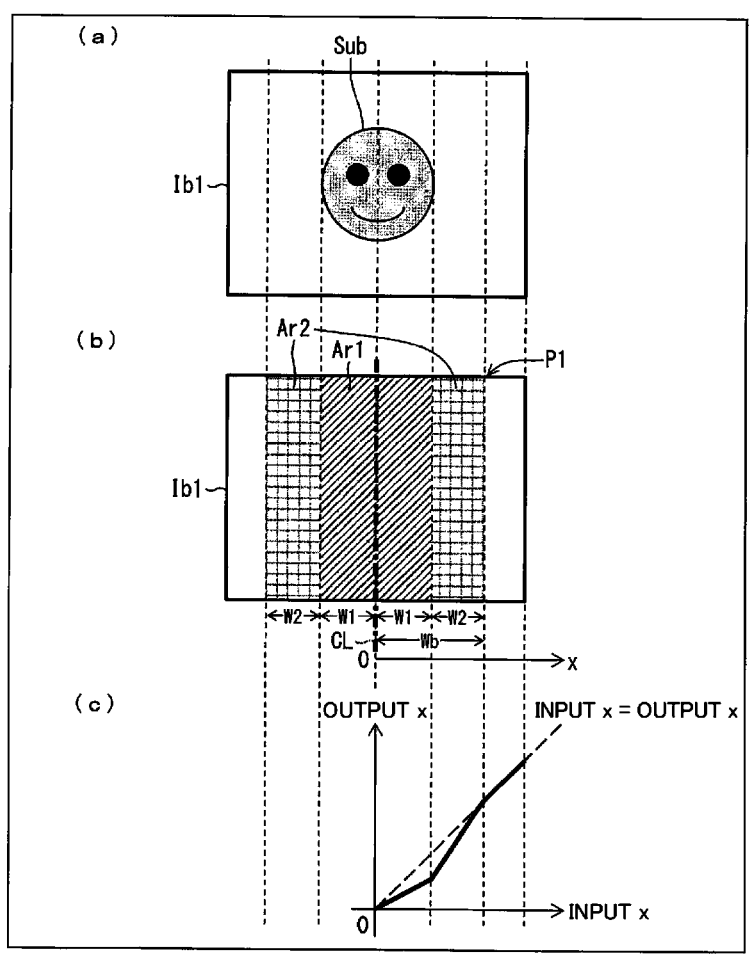
FIG. 2(a) is a diagram illustrating an example of an input image.
FIG. 2(b) is a diagram illustrating an example how a reduction region and an enlargement region are set.
FIG. 2(c) is a diagram illustrating relationship between an x coordinate in the input image and an x coordinate in an output image.

FIG. 2 is a diagram illustrating details on how the reduction region Ar1 and the enlargement region Ar2 are set and how the first magnification is determined. FIG. 2(a) is a diagram illustrating an example of the input image Ib1. FIG. 2(b) is a diagram illustrating examples of the reduction region Ar1 and the enlargement region Ar2 set. FIG. 2(c) is a diagram illustrating relationship between an x coordinate in the input image IB1 and an x coordinate in the output image.

In FIG. 2(c), the horizontal axis and the vertical axis respectively represent the x coordinate in the input image IB1 and the x coordinate in the output image. As illustrated in FIG. 2(b), an x axis is defined in the input image IB1, with the center line CL of the reduction region Ar1 set to be 0. The same applies to the output image, as well as to relationship in each of FIG. 3 and FIG. 10.

FIG. 2(a) illustrates the input image IB1 including the face Sub as the correction target subject. The face Sub is positions substantially at the center of the input image IB1.

The correction region setting unit 42 sets the reduction region Ar1 (hatched region) including the face Sub, in the input image Ib1 as illustrated in FIG. 2(b). The correction region setting unit 42 sets the enlargement regions Ar2 (checkered regions) on the outer sides of the reduction region Ar1.

In the example described above, the reduction region Ar1 and the enlargement region Ar2 are each set as a rectangular region having a predetermined width in the input image Ib1.

The reduction region Ar1 is set to have a width (2×W1) that is the same as the lateral width of the face Sub, and the two enlargement regions Ar2 provided on both sides of the reduction region Ar1. The enlargement regions Ar2 on the left and the right sides each have the width W2 that is the same as a half width W1 of the reduction region Ar1. In other words, the reference width Wb between the center line CL and an end portion P1 of the enlargement region Ar2 includes the width W1 of the reduction region Ar1 and the width W2 of the enlargement region Art in the −x axis direction (predetermined direction) from the center line CL that are the same, and thus width W1:width W2=0.5:0.5. Furthermore, in FIG. 2(b), the ratio between the width W1 of the reduction region Ar1 and the width W2 of the enlargement region Ar2 is the same as the ratio between the width W1 of the reduction region Ar1 and the width W2 of the enlargement region Ar2 set in advance for the input image Ib1. In the present embodiment, the half width W1 of the reduction region Ar1 will be hereinafter simply referred to as the width W1 of the reduction region Ar1.

The image correction unit 44 uses the first magnification and the second magnification determined by the correction intensity determination unit 43 to respectively reduce and enlarge the reduction region Ar1 and the enlargement region Ar2 thus set, to generate the output image as the image after correction.

As illustrated in FIG. 2(b), the enlargement region Ar2 is a rectangular region, and has the width W2 that is the same as the width W1 of the reduction region Ar1, over the entire enlargement region Ar2. In other words, the width W2 is set in such a manner that the ratio between the width W1 of the reduction region Ar1 and the width W2 of the enlargement region Ar2 set in advance for the input image Ib1 is maintained over the entire enlargement region Ar2. Thus, the correction intensity determination unit 43 may determine the values set in advance to be directly used as the first magnification and the second magnification, or may determine the first magnification based on the second magnification and the widths W1 and W2 of the reduction region Ar1 and the enlargement region Ar2. In the latter case, the correction intensity determination unit 43 obtains the first magnification from {1−(second magnification)×(ratio of width W2 of enlargement region Ar2 to reference width Wb)}/(ratio of width W1 of reduction region Ar1 to reference width Wb).

The relationship between the x coordinate in the input image Ib1 and the x coordinate in the output image is as illustrated in FIG. 2(c). The first magnification is set to be smaller than 1, and thus a slope of the x coordinate in the output image relative to the x coordinate in the input image Ib1 is also smaller than 1. Thus, the x coordinate in the output image is small relative to the x coordinate in the input image Ib1 as illustrated in FIG. 2(c). The x coordinate in the output image gets smaller relative to the x coordinate in the input image Ib1, at a portion closer to the enlargement region Ar2. This means that reduction toward the center line CL of the reduction region Ar1 takes place in the reduction region Ar1, with the level of shrinking (a pixel movement amount) being higher at a portion farther from the center line CL.

On the other hand, the second magnification is set to be larger than 1, and thus the value of a slope of the x coordinate in the output image relative to the x coordinate in the input image Ib1 is also larger than 1. This means that enlargement toward the center line CL of the reduction region Ar1 takes place in the enlargement region Ar2, with the level of enlargement (pixel movement amount) being smaller at a portion farther from the center line CL.

The x coordinate in the input image and the x coordinate in the output image match in the end portion P1 of the enlargement region Ar2. Thus, it can be regarded that the image correction unit 44 can generate the output image without causing image quality degradation.

Case where Enlargement Regions have Different Widths

Next, the detail is described based on an example of image correction in a case where the face Sub as the correction target is positioned close to an image end or the size of the face Sub is large relative to the input image Ib2. The case where the face Sub is positioned close to the image end is described as an example.

Figure 3:
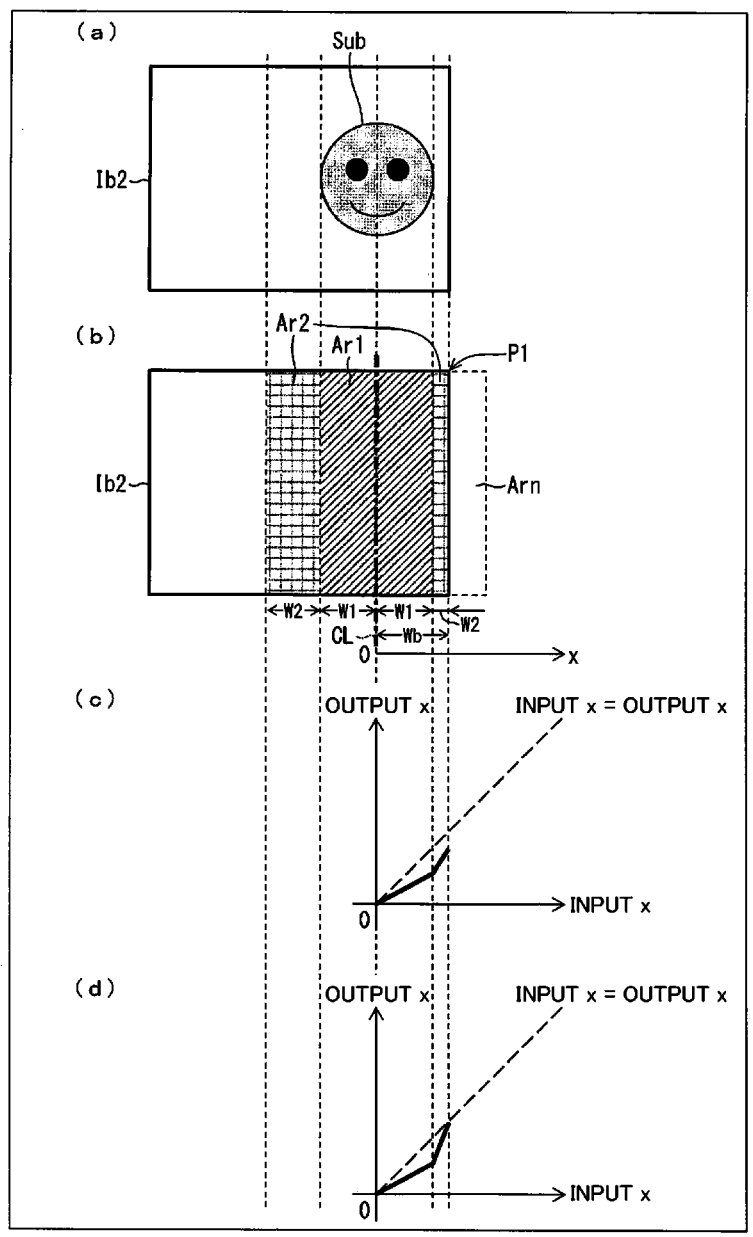
FIG. 3(a) is a diagram illustrating an example of an input image.
FIG. 3(b) is a diagram illustrating an example of how the reduction region and the enlargement region are set.
FIGS. 3(c) and 3(d) are diagrams illustrating relationship between an x coordinate in the input image and an x coordinate in the output image.
Figure 4:
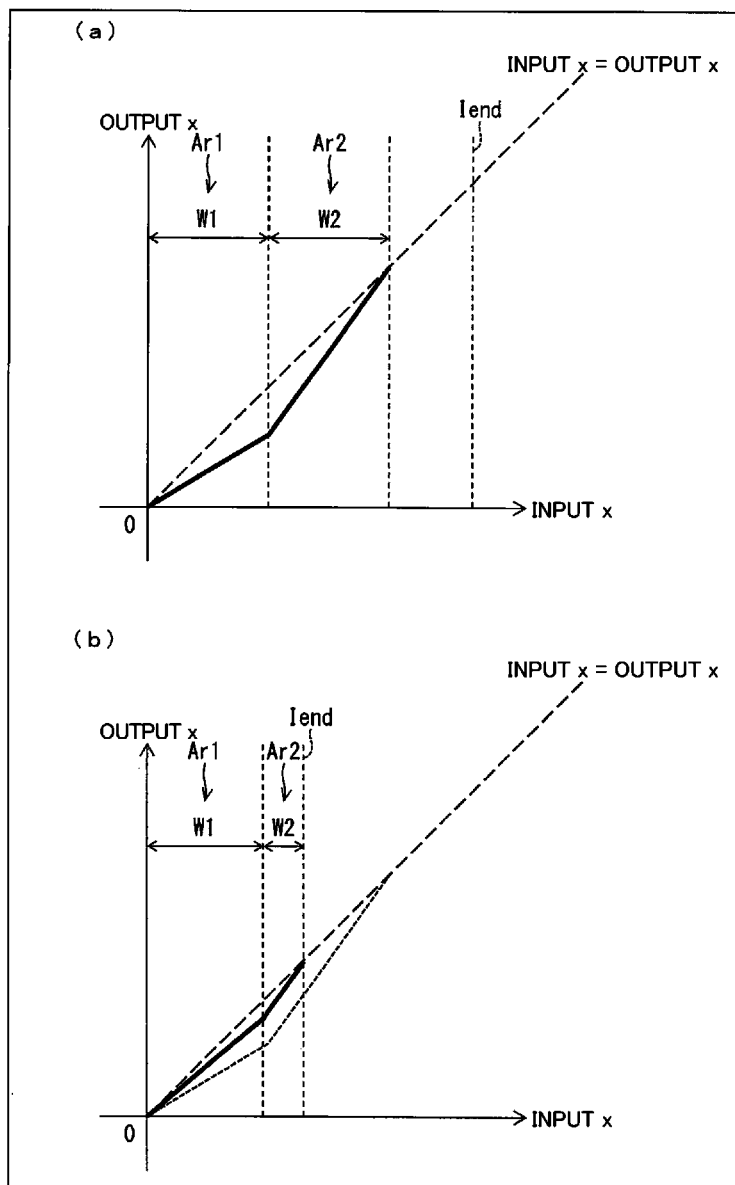
FIGS. 4(a) and 4(b) are diagrams illustrating relationship between an x coordinate in the input image and an x coordinate in the output image.
Figure 5:
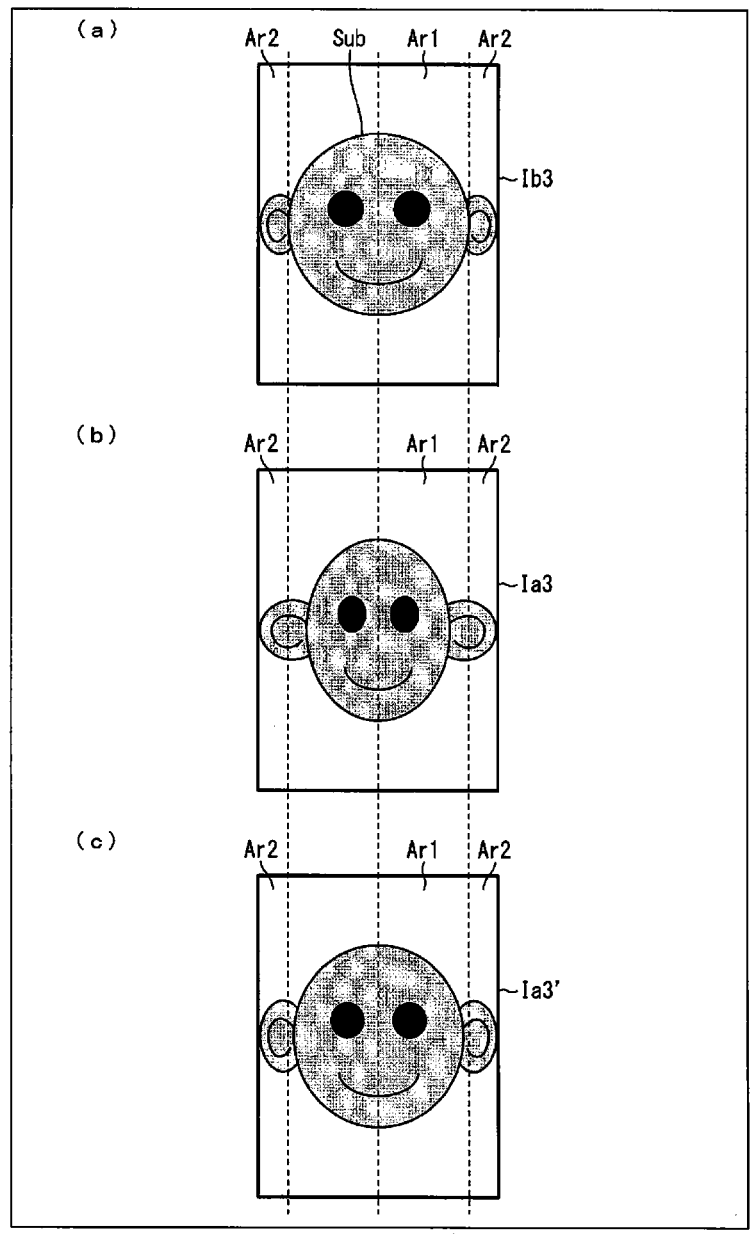
FIG. 5(a) is a diagram illustrating an example of an input image.
FIG. 5(b) is a diagram illustrating an example of an output image obtained by correction using a conventional method.
FIG. 5(c) is a diagram illustrating an example of an output image obtained by correction with processing executed by a control unit of the image printing apparatus.

FIG. 3 is a diagram illustrating how the reduction region Ar1 and the enlargement region Ar2 are set, and how the first magnification is determined, in detail. FIG. 3(a) is a diagram illustrating an example of an input image Ib2. FIG. 3(b) is a diagram illustrating examples of the reduction region Ar1 and the enlargement region Ar2 set. FIG. 3(c) and FIG. 3(d) are diagrams illustrating relationship between an x coordinate in the input image Ib2 and an x coordinate in the output image.

FIG. 3(a) illustrates an input image Ib2 including the face Sub as the correction target subject. Unlike in the case illustrated in FIG. 2(a), the face Sub is positioned close the end portion of the input image Ib2 (on the right side in this example).

The correction region selling unit 42 sets the reduction region Ar1 (hatched region) including the face Sub, in the input image Ib2 as illustrated in FIG. 3(b). The correction region setting unit 42 sets the enlargement regions Ar2 (checkered regions) on the outer sides of the reduction region Ar1.

In the example described above, the reduction region Ar1 and the enlargement region Ar2 are each set as a rectangular region having a predetermined width in the input image Ib2.

The reduction region Ar1 is set to have a width (2×W1) that is the same as the lateral width of the face Sub. The two enlargement regions Ar2 are provided on both sides of the reduction region Ar1. The enlargement region Ar2 on the left side has the width W2 that is the same as the half width W1 of the redaction region Ar1 as in FIG. 2(b). Furthermore, the ratio between the width W1 of the reduction region Ar1 and the width W2 of the enlargement region Ar2 is the same as the ratio between the width W1 of the reduction region Ar1 and the width W2 of the enlargement region Ar2 set in advance for the input image Ib2.

However, with the face Sub being close to the image end unlike in FIG. 2(b), the correction region setting unit 42 cannot set the width W2 of the enlargement region Ar2 on the right side 10 be the same as the width W1 of the reduction region Ar1. Thus, the width W2 of the enlargement region Ar2 on the right side is set to be smaller than the width W2 of the enlargement region Ar2 on the right side in FIG. 2(b) and smaller than the width W1 of the reduction region Ar1 in FIG. 3(b). In other words, the ratio between the width W1 and the width W2 respectively of the reduction region Ar1 and the enlargement region Ar2 that are on the right side is different from the ratio between the width W1 of the reduction region Art and the width W2 of the enlargement region Ar2 set in advance for the input image Ib2.

Specifically, the enlargement region Ar2 on the right side set in the input image Ib1 is smaller than the enlargement region Ar2 on the right side in FIG. 2(b) and the reduction region Ar1 illustrated in FIG. 3(b), each having the width W1, with the difference represented by a region Arn defined by a dotted line. In other words, when the width W1 and the width W2 respectively of the reduction region Ar1 and the enlargement region Ar2 on the right side are set based on a ratio set in advance for FIG. 3(b) (when the width W2 of the enlargement region Ar2 on the right side is set to be the same as the width W1 of the reduction region Ar1, in this example), the region Arn defined by the dotted line can be regarded as a region of the enlargement region Ar2 outside the angle of view.

Problem

It is assumed that the correction processing is executed on the input image Ib2 by using the first magnification and the second magnification set in advance, with the reduction region Ar1 and the enlargement region Ar2 set as illustrated in FIG. 3(b). This results in relationship between the x coordinate in the input image Ib2 and the x coordinate in the output image as illustrated in FIG. 3(c). In such a case, the x coordinate in the input image Ib2 and the x coordinate in the output image do not match in the end portion P1 of the enlargement region Ar2 (the end portion P1=image end, in this example) unlike in the case illustrated in FIG. 2(c). The pixel value at the image end of the output image is determined with reference to the region Arn outside the angle of view of the input image Ib2. However, no pixel value is defined outside the angle of view (in the reference area), and thus the pixel value at the image end of the output image cannot be determined. Thus, the image quality is degraded in the end portion P1 of the output image.

FIG. 3(d) illustrates the relationship as a result of performing the conventional method described above to determine the second magnification to be applied to the enlargement region Ar2. In this case, the pixel value in the reference area is defined unlike in the case illustrated in FIG. 3(c), and thus the pixel value in the end portion P1 in the output image and the pixel value in the end portion P1 in the input image Ib2 can match. Still, a slope in a portion corresponding to the enlargement region Ar2 (thus, the second magnification) is larger than that in FIG. 2(c), as shown in FIG. 3(d). Thus, the enlargement region Ar2 is enlarged to an unnatural level in the output image, resulting in degradation of the image quality.

Processing According to the Present Embodiment

In view of the above, the correction intensity determination unit 43 of the control unit 40 of the image printing apparatus 1 according to the present embodiment determines the first magnification based on the second magnification and the widths W and W2 respectively of the reduction region Ar1 and the enlargement region Ar2 in the input image Ib2 as described above. Specifically, the correction intensity determination unit 43 uses the formula described above to determine the first magnification.

In the present embodiment, the correction intensity determination unit 43 executes the following processing in the x axis direction. Specifically, the correction intensity determination unit 43 determines the preset value (fixed value) to be directly used as the second magnification applied to the enlargement region Ar2. The correction intensity determination unit 43 determines the first magnification by using the second magnification and the widths W1 and W2 respectively of the reduction regions Ar1 and Ar2 that are set to be rectangular regions. For the −x axis direction, the correction intensity determination unit 43 determines die preset values to be directly used as the first magnification and the second magnification, because the ratio between the width W1 of the reduction region Ar1 and the width W2 of the enlargement region Ar2 match the preset ratio and the reduction region Ar1 and the enlargement region Ar2 are set to be within a predetermined range (that is, within the input image Ib1).

FIGS. 4(a) and 4(b) are diagrams illustrating relationship between an x coordinate in the input image and an x coordinate in the output image.

FIG. 4(a) illustrates the relationship between an x coordinate in the input image Ib1 and an x coordinate in the output image as illustrated in FIGS. 2(a) and 2(b), and identical to FIG. 2(c). In the example illustrated in FIG. 4(a), the ratio between the width W1 of the reduction region Ar1 and the width W2 of the enlargement region Ar2 matches the preset ratio (in the example in FIG. 2, the width W1 and the width W2 are the same, and thus width W1:width W2=0.5: 0.5), and the reduction region Ar1 and the enlargement region Ar2 are entirely included within the input image Ib1 (within the angle of view). In such a case, the correction intensity determination unit 43 determines preset values to be directly used as the first magnification and the second magnification applied to the reduction region Ar1 and the enlargement region Ar2. Thus, in this case, the output image with no unnaturalness can be generated without correcting the first magnification or the second magnification.

FIG. 4(b) also illustrates relationship between x coordinates in the input image Ib2 and the output image illustrated in FIGS. 3(a) and 3(b). The relationship is obtained as a result of determining the first magnification and the second magnification by the correction intensity determination unit 43 using the formula. The case illustrated in FIG. 4(b) is different from that in FIG. 4(a) in that the enlargement region Ar2 has a smaller width W2 due to a short distance from the boundary between the reduction region Ar1 and the enlargement region Ar2 to the image end Iend. In other words, the enlargement region Ar2 is partially set to be outside the angle of view if the ratio between the width W1 of the reduction region Ar1 and the width W2 of the enlargement region Ar2 is set to match the preset ratio. In other words, the ratio of the width W1 of the reduction region Ar1 to the reference width Wb in the +x axis direction and the ratio of the width W2 of the enlargement region Ar2 to the reference width Wb in the +x axis direction are different from the ratio set for the input image Ib2 in advance, and the region Arn is set to be outside the angle of view.

In such a case, the correction intensity determination unit 43 obtains the first magnification as follows for example. A preset first magnification is set to be 0.9, and a preset second magnification is set to be 1.1. In the present embodiment, the second magnification is fixed to a set value, and this the correction intensity determination unit 43 determines the second magnification for the enlargement region Ar2 to be 1.1.

In FIG. (b), the ratio between the width W1 of the reduction region Ar1 and the width W2 of the enlargement region Ar2 is assumed to be 0.75:0.25 in the +x axis direction. In other words, the ratio of the width W1 of the reduction region Ar1 to the reference width Wb in the +x axis direction is 0.75, and the ratio of the width W2 of the enlargement region Ar2 to the reference width Wb in the +x axis direction is 0.25. In other words, the ratio between the reduction region Ar1 and the enlargement region Ar2 in the +x axis direction is 0.75:0,25, In this case, the correction intensity determination unit 43 uses the formula described above to obtain the first magnification (1.0−1.1×0.25)/ 0.75≈0.967 (1/10000th digit rounded).

Thus, the relationship illustrated in FIG. 4(b) is obtained in the present embodiment, the reduction region Ar1 and the enlargement region Ar2 are entirely reduced and enlarged respectively by constant first and second magnifications. In other words, the magnification applies to each of the reduction region Ar1 and the enlargement region Ar2 is kept constant.

Thus, the correction intensity determination unit 43 determines the first magnification by using the formula with the second magnification fixed to a present value, particularly in a case where the distance from the boundary between the reduction region Ar1 and the enlargement region Ar2 to the image end Iend is short as illustrated in FIG. 3(b) and FIG. 4(b). Thus, the correction intensity determination unit 43 can correct the first magnification so that the aspect ratio between the input image Ib2 and the output image can be kept constant.

The image correction unit 44 uses the corrected first magnification to reduce the reduction region Ar1 and uses the preset second magnification to enlarge the enlargement region Ar2. Thus, even in the cases illustrated in FIG. 3(b) and FIG. 4(b), the output image can be generated while preventing excessive enlargement of the enlargement region Ar2, with the aspect ratio relative to the input image Ib2 kept constant. In other words, the image correction unit 44 can generate an output image with no unnaturalness even after the processing (correction), whereby the problem described above (degradation of the image quality of the output image) can be solved.

The ratio between the width W1 of the reduction region Ar1 and the width W2 of the enlargement region Ar2 on the right side of the center line CL in the input image Ib2 as illustrated in FIGS. 3(a) and 3(b) match the preset ratio for the input image Ib2. Thus, the image correction unit 44 uses the preset first and second magnifications to correct the input image Ib2, for the reduction region Ar1 and the enlargement region Ar2 on the right side.

Example of Output Image

FIG. 5(a) is a diagram illustrating an example of an input image Ib3, FIG. 5(b) is a diagram illustrating an example of an output image Ia3 obtained by correcting the input image Ib3 with a conventional method, and FIG. 5(c) is a diagram illustrating an example of an output image Ia3' obtained by correcting the input image Ib3 with the processing executed by the control unit 40.

In FIG. 5(a), the face Sub is provided at substantially the center of the input image Ib3 and extends entirely over the input image Ib3 in the lateral direction. When the face Sub set as the correction target is corrected to be thinner the conventional method results in the output image Ia3 generated illustrated in FIG. 5(b) and the processing method performed by the control unit 40 results in the output image Ia3' generated as illustrated in FIG. 5(c).

As illustrated in FIG. 5(b), the output image Ia3 generated by the conventional method is an unnatural image with an ear part of a person positioned in the enlargement region Ar2 excessively enlarged. On the other hand, the output image Ia3' generated by the processing method performed by the control unit 40 has the face Sub corrected to be thinner, without the excessive enlargement of the ear of the person positioned in the enlargement region Ar2, as shown on FIG. 5(c). Thus, the output image Ia3' is an image without unnaturalness.

Flow of Processing Executed by Control Unit

Figure 6:
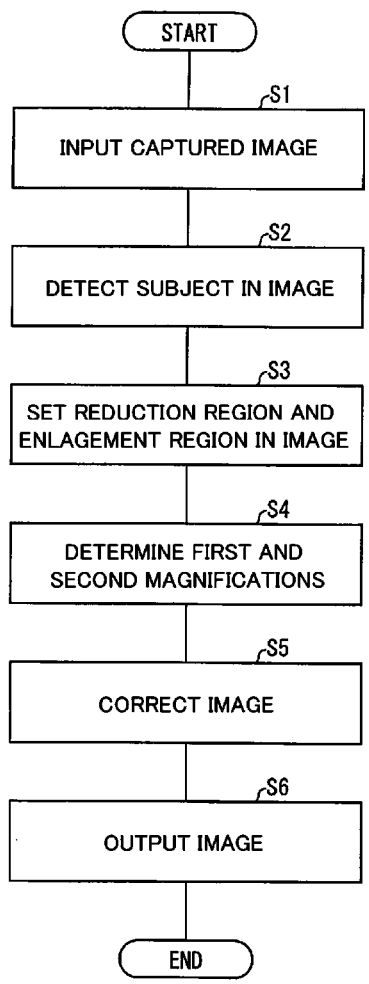
FIG. 6 is a flowchart illustrating a flow of processing executed by the control unit of the image priming apparatus according to the first embodiment of the present disclosure.
Figure 7:
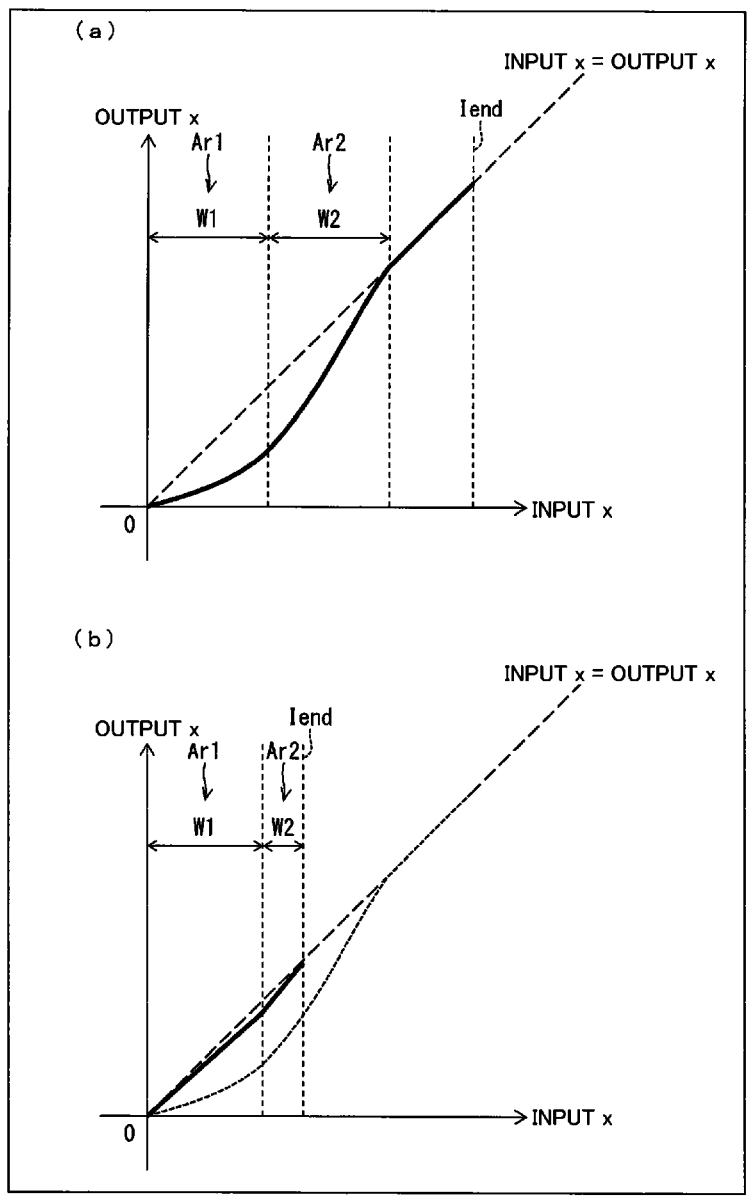
FIGS. 7(a) and 7(b) are diagrams illustrating relationship between an x coordinate in the input image and an x coordinate in the output image.

Next, a flow of processing executed by the control unit 40 of the image printing apparatus 1 according to the present embodiment is described with reference to FIG. 6. FIG. 6 is a flowchart illustrating a flow of processing executed by the control unit 40.

Upon acquiring an image captured by the imaging unit 10 as an input image (S1), the subject detection unit 41 detects a subject to be the correction target in the input image (S2: target region detection step). The correction region setting unit 42 sets the reduction region Ar1 and the enlargement region Ar2 based on information indicated by the subject detected by the subject detection unit 41 (S3). The correction intensity determination unit 43 determines the first magnification for reducing the reduction region Ar1 and the second magnification for enlarging the enlargement region Ar2 (S4: magnification determination step). The image correction unit 44 corrects the input image by reducing and enlarging the reduction region Ar1 and the enlargement region Ar2 by respectively using the first magnification aid the second magnification determined by the correction intensity determination unit 43 (S5: image correction step). Thus, the subject in the input image is corrected. The image correction unit 44 outputs the image after correction to the printing unit 50 or the display unit 30 as the output image (S6).

When the correction intensity determination unit 43 determines the preset values to be directly used as the first magnification and the second magnification, the processing in S4 may be executed before the processing in S2 and S3. If the preset values are used as described above, whether the ratio between the width (W) of the reduction region Ar1 and the width W2 of the enlargement region Ar2 matches the preset ratio can be determined. In such a case, the processing in S4 is executed after the processing in S3.

Modification

The case where the first magnification and the second magnification are each constant over the entire reduction region Ar1 or the enlargement region Ar2 is described above. Specifically, the case where the relationship between the x coordinate in the input image and the x coordinate in the output image can be represented by a straight line as illustrated in FIGS. 4(a) and 4(b) is described above. However, the preset first and second magnifications may not necessarily be constant over the reduction region Ar1 and the enlargement region Ar2.

FIGS. 7(a) and 7(b) are diagrams illustrating the relationship between the x coordinate in the input image and the x coordinate in the output image in a modification of the present embodiment. When the preset first magnification and the second magnification are not constant in the reduction region Ar1 and the enlargement region Ar2, the x coordinate in the input image varies based on a curve illustrated in FIG. 7(a). Also in such a case, the correction intensity determination unit 43 can determine the preset values to be directly used as the first magnification and the second magnification.

When the regions are set as illustrated in FIG. 3(b), the correction intensity determination unit 43 determines the second magnification so that the slope of the enlargement region Ar2 matches that in FIG. 7(a). In such a case, the value of the second magnification may vary among positions in the enlargement region Ar2. The correction intensity determination unit 43 may apply one of the values of the second magnification determined (an average value for example) to the formula to obtain the first magnification. As a result, the image correction unit 44 can correct the input image as illustrated in FIG. 7(b). Thus, the image correction unit 44 can generate an output image without unnaturalness even when the preset values are not constant over the reduction region Ar1 and the enlargement region Ar2 set as illustrated in FIG. 3(b).

Main Effect

As described above, the correction intensity determination unit 43 determines the first magnification based on the second magnification and the widths W1 and W2 respectively of the reduction region Ar1 and the enlargement region Ar2 at least for a position where the width W1 of the reduction region Ar1 and the width W2 of the enlargement region Ar2 are different from each other. Specifically, the first magnification is determined with the preset second magnification and the ratios of the width W1 and the width W2 to the reference width Wb substituted into the formula.

Thus, the degradation of the output image (excessive deformation of a part of the output image for example) which may occur as a result of the conventional method can be suppressed. Thus, the image correction unit 44 can generate an output image with the correction target subject deformed in a desirable and suitable manner.

The correction intensity determination unit 43 can determine to use the preset values for the first magnification and the second magnification for a position where the ratio between the width W1 of the reduction region Ar1 and the width W2 of the enlargement region Ar2 match a preset ratio. At the position, the output image with the correction target subject deformed in a desirable and suitable manner can be obtained without using the formula and with the preset first and second magnifications directly used.

In this manner, the image correction unit 44 can generate an output image with the input image entirely deformed in a suitable manner, with the correction intensity determination unit 43 determining the first magnification and the second magnification in accordance with the width W1 of the reduction region Ar1 and the width W2 of the enlargement region Ar2 in a predetermined direction.

As described above, the output image deformed in a suitable manner can be obtained when the correction intensity determination unit 43 determines the first magnification by using the formula, regardless of the width W1 of the reduction region Ar1 and the width W2 of the enlargement region Ar2 set to the input image.

Supplement

In the above description, the correction intensity determination unit 43 determines the preset value to be directly used as the second magnification applied to the enlargement region Ar2. However, this should not be construed in a limiting sense. Specifically, it suffices if the preset second magnification can be directly applied to the enlargement region Ar2, and thus the preset second magnification may not be determined by the correction intensity determination unit 43 to be the second magnification to be applied to the enlargement region Ar2. In such a case, the control unit 40 executes the following modified processing.

Specifically, the correction intensity determination unit 43 determines the first magnification based on the width W1 of the reduction region Ar1 and the width W2 of the enlargement region Ar2. An example of the method of determining the first magnification is as described above. The image correction unit 44 reduces the reduction region Ar1 by using the first magnification determined by the correction intensity determination unit 43 and enlarges the enlargement region Ar2 by using the preset second magnification.

The output image obtained by executing this modified processing will be the same as the output image obtained by executing the processing as described in the present embodiment. Thus, the degradation of the output image which may occur as a result of the conventional method can be suppressed.

The modified processing is also applicable in second and third embodiments, when a predetermined second magnification is used.

Second Embodiment

Another embodiment of the present disclosure is described below with reference to FIG. 8 to FIG. 10. Members having the functions that are the same as those of the members described in the embodiment described above will be denoted with the same reference numerals, and the description thereof will be omitted.

In the first embodiment, the direction of correction (direction of enlargement or reduction, referred to as a correction direction) is the x axis direction. In the present embodiment, a case is described where the correction direction varies among positions in the input image. FIGS. 8(a) to 8(c) are diagrams illustrating processing executed by the control unit 40, and includes FIG. 8(a) that is a diagram illustrating an example of an input image Ib4, FIG. B(b) that is a diagram illustrating an example of how the reduction region Ar1 and the enlargement region Ar2 are set, and FIG. 8(c) that is a diagram illustrating an example of an output image Ia4.

FIG. 8(a) illustrates the input image Ib4 including a face Sub that is the correction target subject. The face Sub is positions substantially at the center of the input image IB4.

In the present embodiment, the correction region setting unit 42 sets the reduction region Ar1 where reduction toward a center Ct (correction center, predetermined position) of the face Sub takes place as illustrated in FIG. 8(b), in accordance with the distance from the center Ct. In other words, the reduction region Ar1 is a region that is reduced toward its center set to substantially match the center Ct of the face Sub. In the present embodiment, the distance from the center Ct (radius in this case) corresponds to the width W1 of the reduction region Ar1. In other words, the reduction region Ar1 has the width W1 extending in a plurality of directions (predetermined directions) from the center Ct.

The correction region setting unit 42 sets the enlargement region Ar2 on the outer side of the reduction region Ar1, to have the width W2 extending in a plurality of directions from the center Ct. In other words, the width W2 of the enlargement region Ar2 corresponds to the distance from the be unitary between the reduction region Ar1 and the enlargement region Ar2 to the end portion P1 of the enlargement region Ar2. With the enlargement region Ar2 thus set, the width W2 of the enlargement region Ar2 depends on the distance between the center Ct and the image end in each direction.

As described above, the correction region setting unit 42 sets the reduction region Ar1 and the enlargement region Ar2 to expand in the input image Ib4 about the center Ct of the face Sub serving as the center. The center Ct can also be regarded as the center of the reduction region Ar1.

As illustrated in FIG. 8(e), the image correction unit 44 generates the output image Ia4 as a result of reducing and enlarging the reduction region Ar1 and the enlargement region Ar2 by using the first magnification and the second magnification determined by the correction intensity determination unit 43. Comparison between the input image Ib4 and the output image Ia4 indicates that the face Sub in the output image Ia4 is corrected to be smaller in the vertical direction (y axis direction) and in the lateral direction (x axis direction). More specifically, in the reduction region Ar1 and the enlargement region Ar2, a pixel on the left side of the center Ct is corrected to move rightward and a pixel on the right side of the center Ct is corrected to move leftward. A pixel on the lower side of the center Ct is corrected to move upward and a pixel on the upper side of the center Ct is corrected to move downward.

In this manner, in the present embodiment, the correction direction indicates a direction toward the center Ct in each of straight lines extending from a plurality of directions from the center Ct, and the face Sub is corrected to be reduced toward the center Ct (that is, the correction target center). In other words, unlike in the first embodiment, the correction direction varies among the pixel positions in the input image Ib4.

The center Ct may be the position of the center of a plurality of parts (two eyes and a mouth in the face Sub, for example) in the subject, obtained by the subject detection unit 41 for example.

Specific Example of Correction Processing

Next, a specific example of correction processing in the present embodiment is described with reference to FIG. 8 and FIG. 9. Also in this specific example, a description is given assuming that the preset the ratio between the width W1 of the reduction region Ar1 and the width W2 of the enlargement region Ar2 is width W1:width W2=0.5.0.5 in the input image.

Case where Enlargement Regions have the Same Widths

When the face Sub is substantially al the center of the input image Ib4 as illustrated in FIG. 8(a), the width W1 of the reduction region Ar1 and the width W2 of the enlargement region Ar2 set by the correction region setting unit 42 are uniform over the entirety as illustrated in FIG. 8(b). In other words, a ratio of the width W1 of the reduction region Ar1 to the reference width Wb (a distance from the center Ct to the end portion P1 of the enlargement region Ar2 in the present embodiment) and a ratio of the width W2 of the enlargement region Ar2 to the reference width Wb are each 0.5. In this example, this means that the ratio between the width W1 of the reduction region Ar1 and the width W2 of the enlargement region Ar2 in FIG. 8(b) matches the preset ratio in the input image Ib4.

Thus, as in the first embodiment, the correction intensify determination unit 43 determines the preset values to be the first magnification and the second magnification. Alternatively, the correction intensity determination unit 43 determines the first magnification by using the preset value as the second magnification and by using the formula.

In the latter case, for each of the straight lines, the correction intensity determination unit 43 uses the following formula to obtain the first magnification: first magnification={1−(second magnification)×(ratio of width W2 of enlargement region Ar2 to reference width Wb in predetermined direction from center Ct)}/(ratio of width W1 of reduction region Ar1 to reference width Wb in predetermined direction from center Ct). In such a case, the first magnification is the same as the preset value in all directions.

As a result, the image correction unit 44 can generate the output image Ia4 with the aspect ratio relative to the input image Ib4 maintained as illustrated in FIG. 8(c).

Case where Enlargement Regions have Different Widths

Next, an example of image correction performed in a case where the face Sub as the correction target is positioned close to an image end or the face Sub has a large size relative to the input image Ib5. The case where the face Sub is positioned close to the image end is described as an example.

Figure 9:
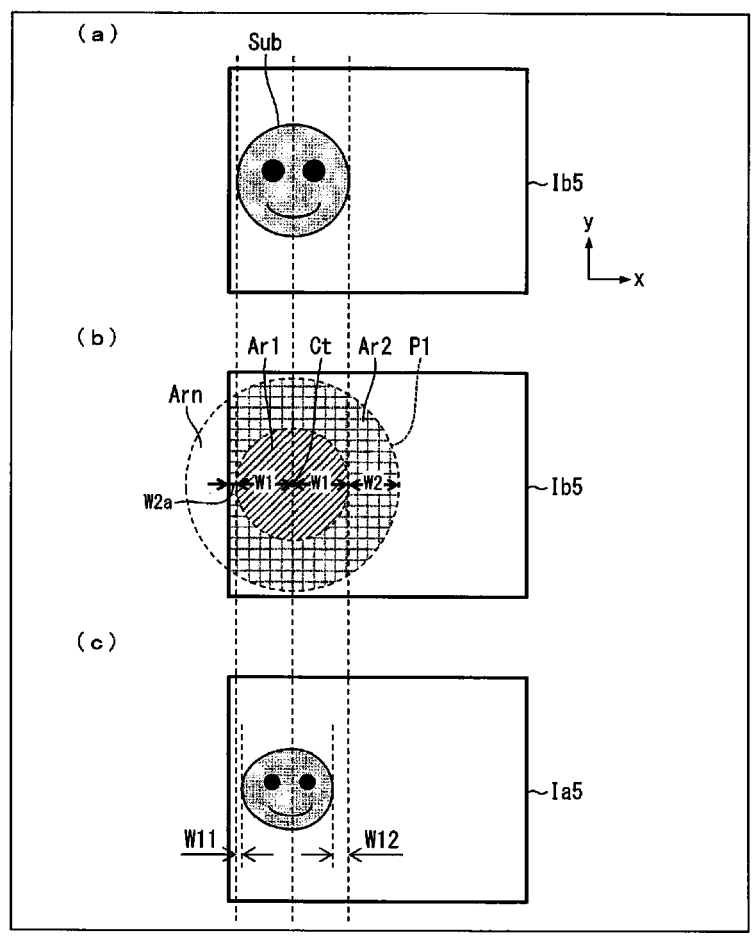
FIG. 9(a) is u diagram illustrating an example of an input image.
FIG. 9(b) is a diagram illustrating an example of how the reduction region and the enlargement region are set.
FIG. 9(e) is a diagram illustrating an example of an output image.

FIG. 9 is a diagram illustrating a specific example of correction processing, and includes FIG. 9(a) that is a diagram illustrating an example of an input image Ib5. FIG. 9(b) that is a diagram illustrating an example of how the reduction region Ar1 and the enlargement region Ar2 are set, and FIG. 9(c) that is a diagram illustrating an example of an output image Ia5.

FIG. 9(a) illustrates the input image Ib5 including the face Sub as the correction target subject. Unlike in the case illustrated in FIG. 8(a), the face Sub is positioned close to an end portion of the input image Ib5 (on the left side in this example).

Figure 8:
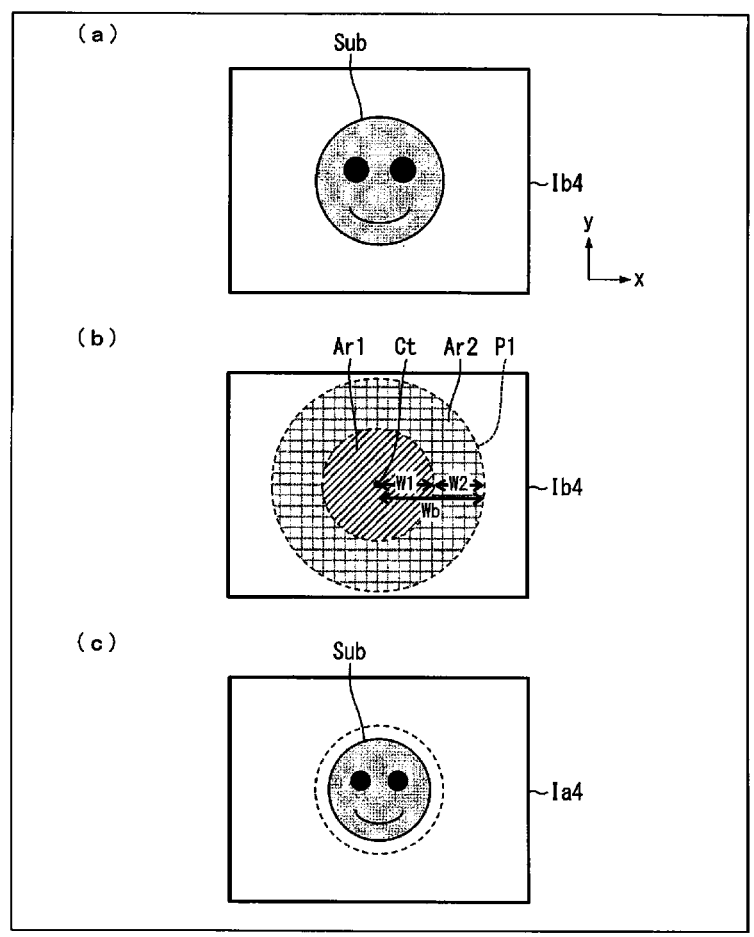
FIGS. 8(a) to 8(c) are diagrams illustrating processing executed by a control unit of an image printing apparatus according to a second embodiment of the present disclosure, and includes FIG. 8(a) that is a diagram illustrating an example of an input image, FIG. 8(b) that is a diagram illustrating an example of how the reduction region and the enlargement region are set, and FIG. 8(c) that is a diagram illustrating an example of an output image.

As illustrated in FIG. 9(b), the correction region setting unit 42 sets the reduction region Ar1 to include the face Sub in the input image Ib5 based on the position and the size of the face Sub, as in the case illustrated in FIG. 8. The correction region setting unit 42 sets the enlargement region Ar2 to be on the outer side of the reduction region Ar1. Specifically, the reduction region Ar1 and the enlargement region Ar2 expanding with die center Ct of the face Sub being the center are set in the input image Ib5.

The reduction region Ar1 is set to have the width W1(=radius, diameter=2×W1) corresponding to the size of the face Sub. The width W2 of the enlargement region Ar2 on the right side is set to be the same as the width W1 over the entire enlargement region Ar2, so that the preset ratio between the width W1 of the reduction region Ar1 and the width W2 of the enlargement region Ar2 for the input image Ib5 is maintained.

Unlike in FIG. 8(b), the face Sub is close to the image end, and thus the width W2 of the enlargement region Ar2 on the left side cannot be set to be the same as the width W1 of the reduction region Ar1 by the correction region setting unit 42 in the input image Ib5. Thus, the width W2 of the enlargement region Ar2a on the left side of the input image Ib5 is set to be smaller than the width W2 of the enlargement region Ar2 on the left side in FIG. 8(b) or than the width W1 of the reduction region Ar1 in FIG. 9(b). In other words, the ratio between the width W1 of the reduction region Ar1 and the width W2 of the enlargement region Ar2 on the left side is different from the preset ratio between the width W1 of the reduction region Ar1 and the width W2 of the enlargement region Ar2 for the input image Ib5. The width W2 of the enlargement region Ar2 smaller than the width W1 of the reduction region Art is referred to as a width W2a for the sake of simplicity of the description.

Specifically, the enlargement region Ar2 on the left side set in the input image Ib5 is smaller than the enlargement region Ar2 on the left side in FIG. 8(b), with the different represented by a region Arn defined by a dotted line. In other words, when the width W1 of the reduction region Ar1 and the width W2 of the enlargement region Ar2 on the left side are set with the preset ratio (when the width W2 of the enlargement region Ar2a is set to be the same as the width W1 of the reduction region Ar1 in this example) in FIG. 9(b), the region Arn defined by the dotted line can be regarded as a region of the enlargement region Ar2 on the left side outside the angle of view.

The correction intensity determination unit 43 executes processing similar to that in FIG. 8 is executed on a region of the enlargement region Ar2 illustrated in FIG. 9(b) where the preset ratio is maintained (the region where the width W2 of the enlargement region Ar2 is the same as the width W1 of the reduction region Ar1 in this example). Specifically, the correction intensity determination unit 43 determines the preset values to be directly used as the first magnification and the second magnification. Alternatively, the correction intensity determination unit 43 determines the preset value to be directly used as the second magnification, and determines the first magnification by using the formula for each of the straight lines.

On the other hand, for a region in the enlargement region Ar2 adjacent to the region Arn outside the angle of view in the input image Ib5, the correction intensity determination unit 43 determines the preset value to be directly used as the second magnification. The correction intensity determination unit 43 determines the first magnification by using the formula for each of the straight lines.

In the region adjacent to the region Arn, the width W2a varies among the straight lines. In the example illustrated in FIG. 9(b), the region adjacent to the region Arn has the width W2a which is the smallest on the straight line extending in the −x axis direction from the center Ct, and increases toward the ±y axis direction from the straight line. Thus, the correction intensity determination unit 43 uses the formula for the region so that the first magnification to be applied can be obtained to be the largest on the straight line extending in the −x axis direction from the center Ct, and to decrease toward the ±y axis direction from the straight line.

In other words, as illustrated in FIG. 9(e), in the output image Ia5, the smallest reduction width W11 is achieved on the straight line extending in the −x axis direction from the center Ct. On the other hand, the largest reduction width W12 is achieved on the straight line satisfying width W1−width W2 including the straight line extending in the +x axis direction from the center Ct. Thus, in the output image Ia5, the face Sub after the correction has the reduction width that is smaller on the side of the region Arn than other regions.

FIG. 9(c) illustrates au example where the reduction width of the face Sub largely varies among the positions within the output image Ia5, that is, an example where the reduction width is smaller on the right side region of the enlargement region Ar2 than the left side region thereof. Actually, the correction intensity determination unit 43 determines the first magnification and the second magnification so that the aspect ratio is maintained before and after the correction. Thus, the image correction unit 44 can generate the output image Ia5 in which the face Sub is reduced in the direction toward the center Ct, while maintaining the aspect ratio relative to the input image Ib5.

Specifically, also when the correction toward the center Ct is performed, the correction intensity determination unit 43 determines the first magnification by using the formula for at least a region in the input image Ib5 where the width W2 of the enlargement region Ar2 is smaller than the width W1 of the reduction region Ar1 (that is, a region where the ratio between the width W1 of the reduction region Ar1 and the width W2 of the enlargement region Ar2 is different from the preset ratio) as in the first embodiment. Thus, even when the distance from the center Ct to the image end in each direction is smaller than the distance from the center Ct to the end portion P1 of the enlargement region Ar2 including the region Arn, the output image Ia5 can be generated with the aspect ratio relative to the input image Ib5 maintained.

The correction intensity determination unit 43 may determine the first magnification and the second magnification, with small variation in the reduction width among the directions from the center Ct.

Modification

Next, a modification of the present embodiment is described with reference to FIG. 10. FIG. 10 is a diagram illustrating a modification of the present embodiment, and illustrates an example of how the reduction region Ar1 and the enlargement region Ar2 are set.

The processing in a case where the face Sub is reduced toward the center Ct with the distance from the center Ct to the image end varying among the correction directions has been described above with reference to FIG. 9. However, the processing executed by the control unit 40 according to the present embodiment is not limited to the case of correction toward the center Ct, and can be applied to correction toward the center line CL (predetermined position) of the face Sub.

Figure 10:
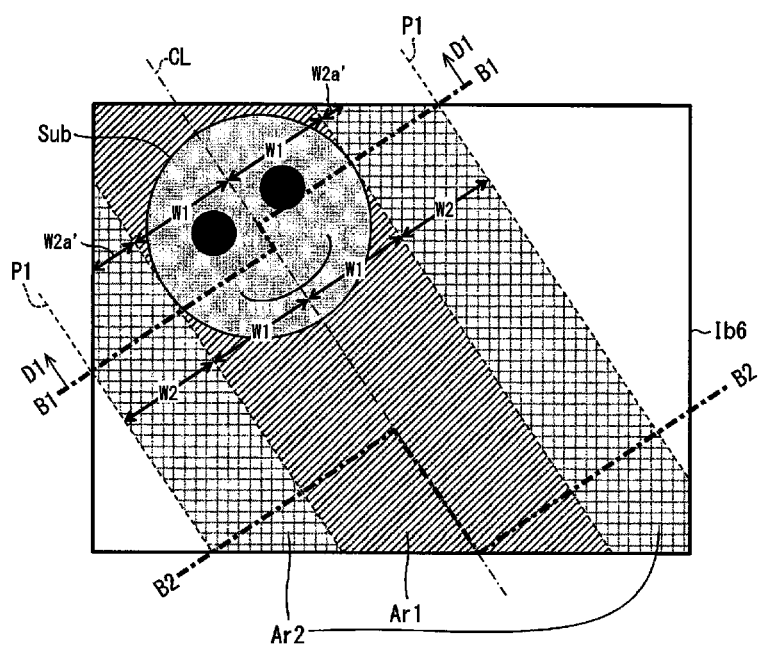
FIG. 10 is a diagram illustrating how the reduction region and the enlargement region are set.

FIG. 10 illustrates an input image Ib6 including the face Sub as the correction target subject. The face Sub is positioned close to an end portion (on the upper side in this example) of the input image Ib6. In FIG. 10, the face Sub (center line CL) is inclined relative to the input image Ib6.

Now, a case is considered where the face Sub is corrected to be thin by being reduced in a direction orthogonal to the center line CL. In such a case, the correction region setting unit 42 sets a reduction region Ar1 having the width W1 in the input image Ib6 to include the face Sub as illustrated in FIG. 10. The reduction region Ar1 is set to have the end portion in parallel with the center line CL. The correction region setting unit 42 sets the enlargement regions Ar2 each having the width W2 on the outer side of the reduction region Ar1. In other words, the reduction region Ar1 and the enlargement regions Ar2 are regions expanded about the center line CL serving as the center.

As illustrated in FIG. 10, if the center line CL is inclined relative to the input image Ib6, the distance from the image end varies among positions in the input image Ib6. Specifically, the width W2 of the enlargement region Ar2 is the same as the width W1 in a region between the boundaries B1 and B2 but is different from the width W1 in other regions. In the example illustrated in FIG. 10, the width W2 of an enlargement region Ar2a' is smaller than the width W1 in a region extending in a direction D1 from the boundary B1. In other words, the ratio between the width W1 of the reduction region Ar1 and the width W2 of the enlargement region Ar2 matches the preset ratio for the input image Ib6 in the region between the boundaries B1 and B2, but is different from the preset ratio in other regions. The width W2 of the enlargement region Ar2 in the region is referred to as a width W2a' for the sake of easier description.

When the preset first and second magnifications are applied to the region other than the region between the boundaries B1 and B2 in the presence of such an inclination, a problem that the image quality degrades as described with reference to FIGS. 3(c) and 3(d) occurs as in the case of FIG. 9.

Still, also in the present modification, the correction intensity determination unit 43 directly applies the preset value as the second magnification at least in the region, when the correction toward the center line CL is performed. The correction intensity determination unit 43 determines the first magnification based on the second magnification and the widths W1 and W2 respectively of the reduction region Ar1 and the enlargement region Ar2 (width W2a'), for each of straight lines extending in a plurality of directions from the center line CL. Specifically, the correction intensity determination unit 43 obtains the first magnification for each of the straight lines, by using the following formula: first magnification={1−(second magnification)−(ratio of the width W2 of the enlargement region Ar2 to the reference width Wb in a predetermined direction from the center line CL)}/(ratio of the width W1 of the reduction region Ar1 to the reference width Wb, in the predetermined direction from the center line CL). Thus, even when the distance from the center line CL to the image end in each direction is shorter than the distance from the center line CL to the end portion P1 of the enlargement region Ar2 including a region outside the angle of view, the output image can be generated with the aspect ratio relative to the input image Ib6 maintained.

The center line CL may be set based on a part of the subject close to the center of the subject obtained by the subject detection unit 41. If the subject is the face Sub, the center line CL may be a line passing through the center of the two eyes or through the nose. If the subject is a body, the center line may be a line passing through the navel.

Third Embodiment

Figure 11:
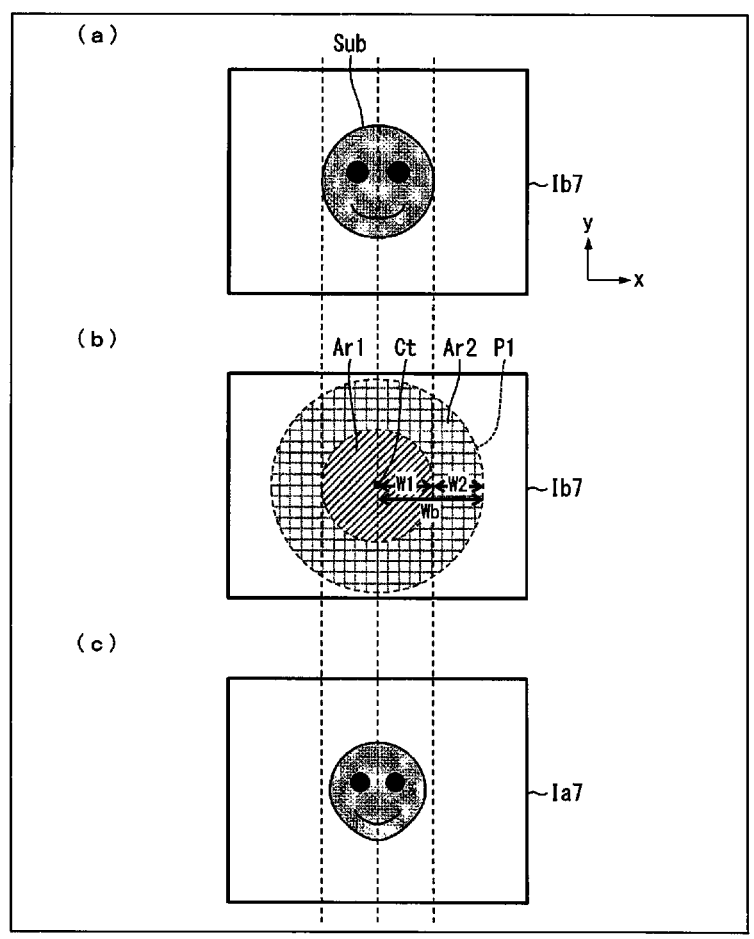
FIGS. 11(a) to 11(c) are diagrams illustrating processing executed by a control unit of an image printing apparatus according to a third embodiment of the present disclosure, and includes FIG. 11(a) that is a diagram illustrating an example of an input image, FIG. 11(b) that is a diagram illustrating an example of how the reduction region and the enlargement region are set, and FIG. 11(c) that is a diagram illustrating an example of an output image.

Another embodiment of the present disclosure is described below with reference to FIG. 11 to FIG. 13. Members having the fractions that are the same as those of the members described in the embodiment described above will be denoted with the same reference numerals, and the description thereof will be omitted.

In the present embodiment, a case is described where the correction direction varies among positions in the input image, as in the second embodiment. As in the second embodiment, a case is described as an example where the width W1 and the width W2 of the reduction region Ar1 and the enlargement region Ar2, set in advance in the input image, are the same (in other words, when the ratio between the width W1 and the width W2 of the reduction region Ar1 and the enlargement region Ar2 is width W1:width W2=0.5: 0.5). In the present embodiment, an example is further described where the first magnification is changed in the correction direction also when the reduction region Ar1 and the enlargement region Ar2 are set to be in the angle of view (first specific example described later). Furthermore, an example is described where the first magnification is determined by using a second magnification that has been corrected (corrected second magnification) without applying the preset value as the second magnification (second specific example described later). Regarding these points, the processing in the present embodiment is different from that in the second embodiment.

First Specific Example of Correction Processing

First of all, a specific example of correction processing executed when the face Sub as the correction target is substantially at the center of an input image Ib7. FIGS. 11(a) to 11(c) are diagrams illustrating a specific example of correction processing, and includes FIG. 11(a) that is a diagram illustrating an example of an input image Ib7. FIG. 11(b) that is a diagram illustrating an example of how the reduction region Ar1 and the enlargement region Ar2 are set, and FIG. 11(c) that is a diagram illustrating an example of an output image Ia7.

FIG. 11(a) illustrates the input image Ib7 including the face Sub as the correction target subject. The face Sub is positioned at substantially the center of the input image Ib7.

The correction region setting unit 42 sets the reduction region Ar1 and the enlargement region Ar2 as illustrated in FIG. 11(b), in a manner that is similar to that described with reference to FIG. 8(b) in the second embodiment. In other words, the correction region setting unit 42 sets the reduction region Ar1 and the enlargement region Ar2 that expands with the center Ct of the face Sub being the center in the input image Ib7.

In FIG. 11(b), the width W2 of the enlargement region Ar2 is the same as the width W1 of the reduction region Ar1. However, in the present embodiment, first and second magnifications applied to at least one of a plurality of directions (straight lines) extending from the center Ct are set in advance to be values different from the first and the second magnifications applied to the other directions.

For example, when the face Sub is the subject, the first and the second magnifications are set so that the correction intensity becomes the highest on diagonally lower sides of the face Sub and becomes the lowest on the upper side (+y axis direction) of the face Sub. In other words, on the diagonally lower sides of the face Sub, the first magnification is set to be relatively small and the second magnification is set to be relatively large to achieve a large different between the first magnification and the second magnification. On the upper side of the face Sub, the first magnification is set to be relatively large and the second magnification is set to be relatively small to achieve a small difference between the first magnification and the second magnification. In this manner, the correction intensity is variably set in accordance with the position in the face Sub.

When the subject detection unit 41 detects the face Sub as the subject, the correction intensity determination unit 43 determines the preset values to be directly used as the first magnification and the second magnification for each direction. In other words, the correction intensity determination unit 43 determines the preset values to be directly used as the first magnification and the second magnification so that the first magnification and the second magnification in at least one direction is different from those in the other directions, when the ratio between width W1 of the reduction region Ar1 and the width W2 of the enlargement region Ar2 match the preset ratio (when the width W1 of the reduction region Ar1 and the width W2 of the enlargement region Ar2 are the same in this example).

Thus, the image correction unit 44 can generate the output image Ia7 as a result of reducing the face Sub so that the face Sub becomes smaller as a whole and will give an impression that a chin line is sharp. Thus, the image correction unit 44 can generate the output image Ia7 giving more favorable impression.

Also when the width W1 of the reduction region Ar1 and the width W2 of the enlargement region Ar2 are defined as distances from the center line CL, the first magnification and the second magnification set as described above can be applied. The first magnification and the second magnification in each direction are set based on the type of the subject, and thus a favorable correction result can be obtained for each type.

Second Specific Example of Correction Processing

Next, an example of image correction in a case is described where the face Sub as the correction target is positioned close to the image end or has a large size relative to the input image Ib8 will be described. The case where the face Sub is positioned close to the image end is described as an example. FIGS. 12(a) to 12(d) are diagrams illustrating processing executed by the control unit 40, and includes FIG. 12(a) that is a diagram illustrating an example of an input image Ib8, FIG. 12(b) that is a diagram illustrating an example of how the reduction region Ar1 and the enlargement region Ar2 are set, FIG. 12(c) that is a diagram illustrating an example of an output image Ia8 as a result of correction by the processing executed by the control unit 40 according to the second embodiment, and FIG. 12(d) that is a diagram illustrating an example of an output image Ia8' as a result of the processing executed by the control unit 40 of the present embodiment.

FIG. 12(a) illustrates the input image Ib8 including the face Sub that is the correction target subject. The face Sub is positioned at an end portion (lower left side in this example) of the input image Ib8.

The correction region setting unit 42 sets the reduction region Ar1 and the enlargement region Ar2 as illustrated in FIG. 12(b), in a manner similar to that described above with reference to FIG. 9(b) in the second embodiment. In other words, the correction region selling unit 42 sets the reduction region Ar1 and the enlargement region Ar2 that expands about the center Ct of the face Sub in the input image Ib8.

Figure 12:
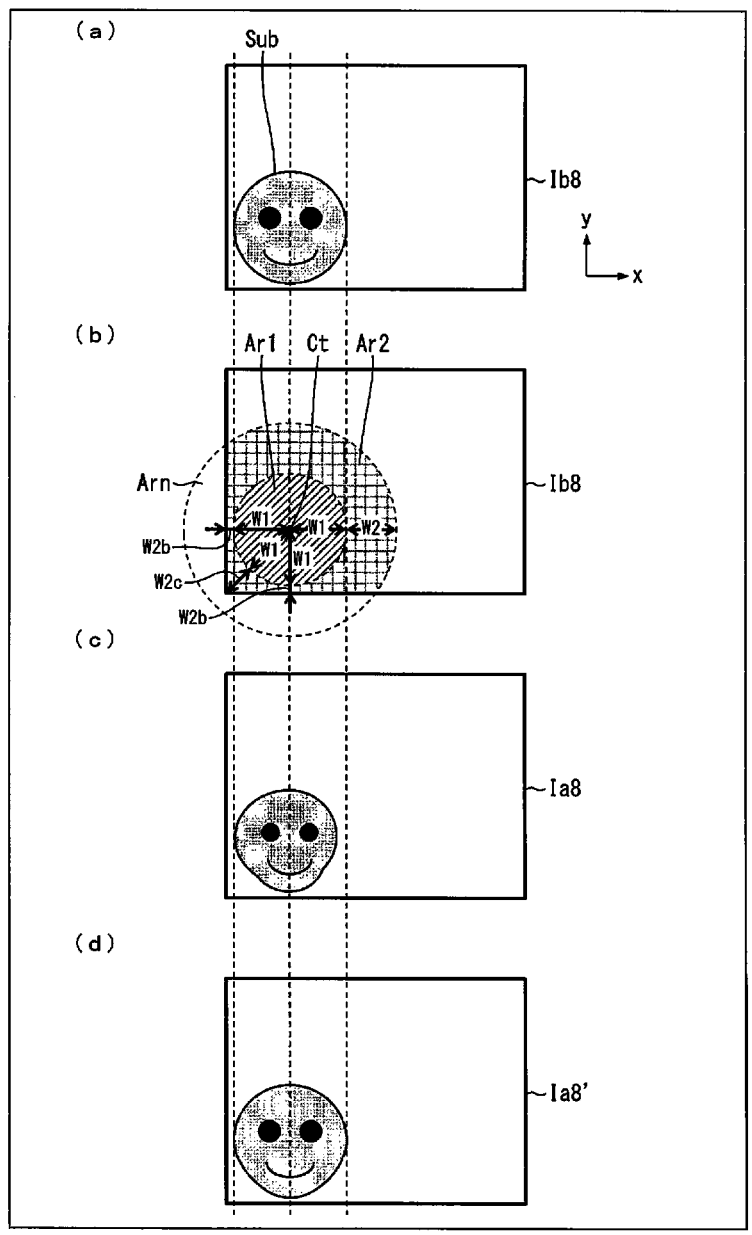
FIGS. 12(a) to 12(d) are diagrams illustrating processing executed by the control unit of the image printing apparatus according to the third embodiment of the present disclosure, and includes FIG. 12(a) that is a diagram illustrating an example of an input image, FIG. 12(b) that is a diagram illustrating an example of how the reduction region and the enlargement region are set, FIG. 12(c) that is a diagram illustrating an example of an output image as a result of correction by the processing executed by the control unit according to the second embodiment, and FIG. 12(d) that is a diagram illustrating an example of an output image as a result of the processing executed by the control unit of the third embodiment.
Figure 13:
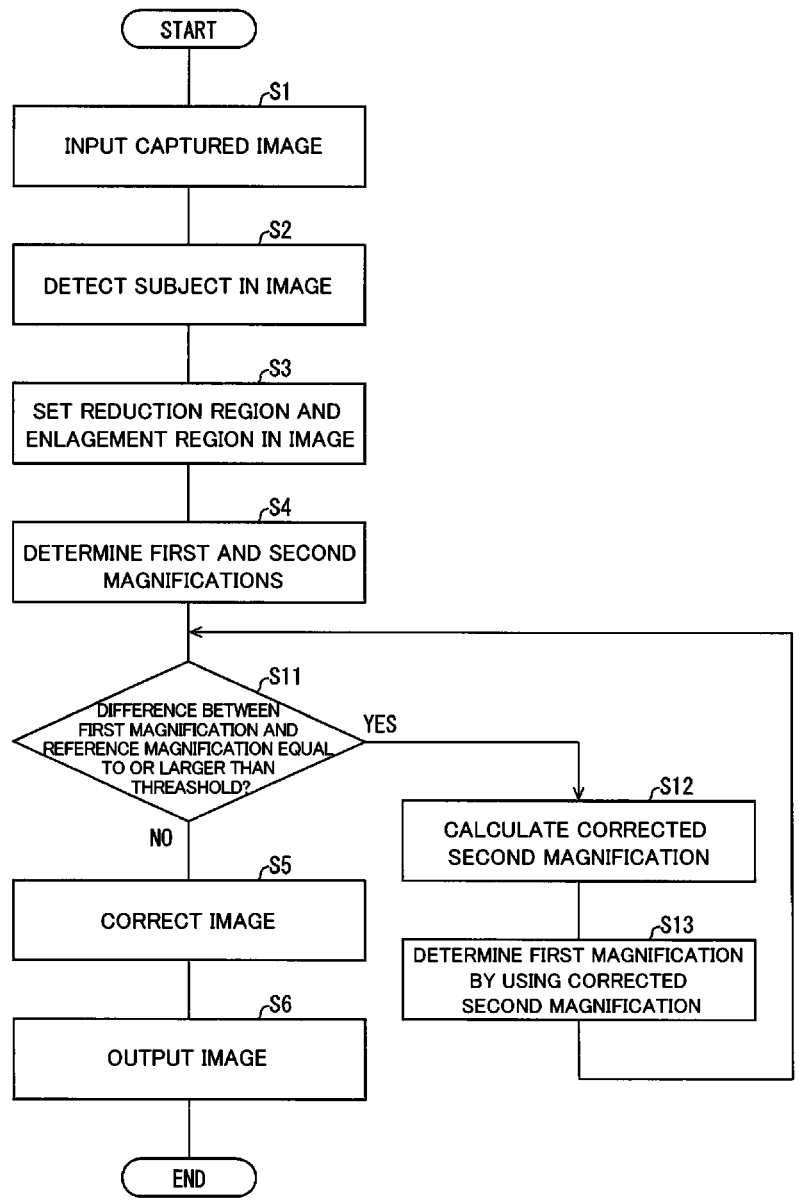
FIG. 13 is a flowchart illustrating a flow of the processing executed by the control unit of the image printing apparatus according to the third embodiment of the present disclosure.
Figure 14:
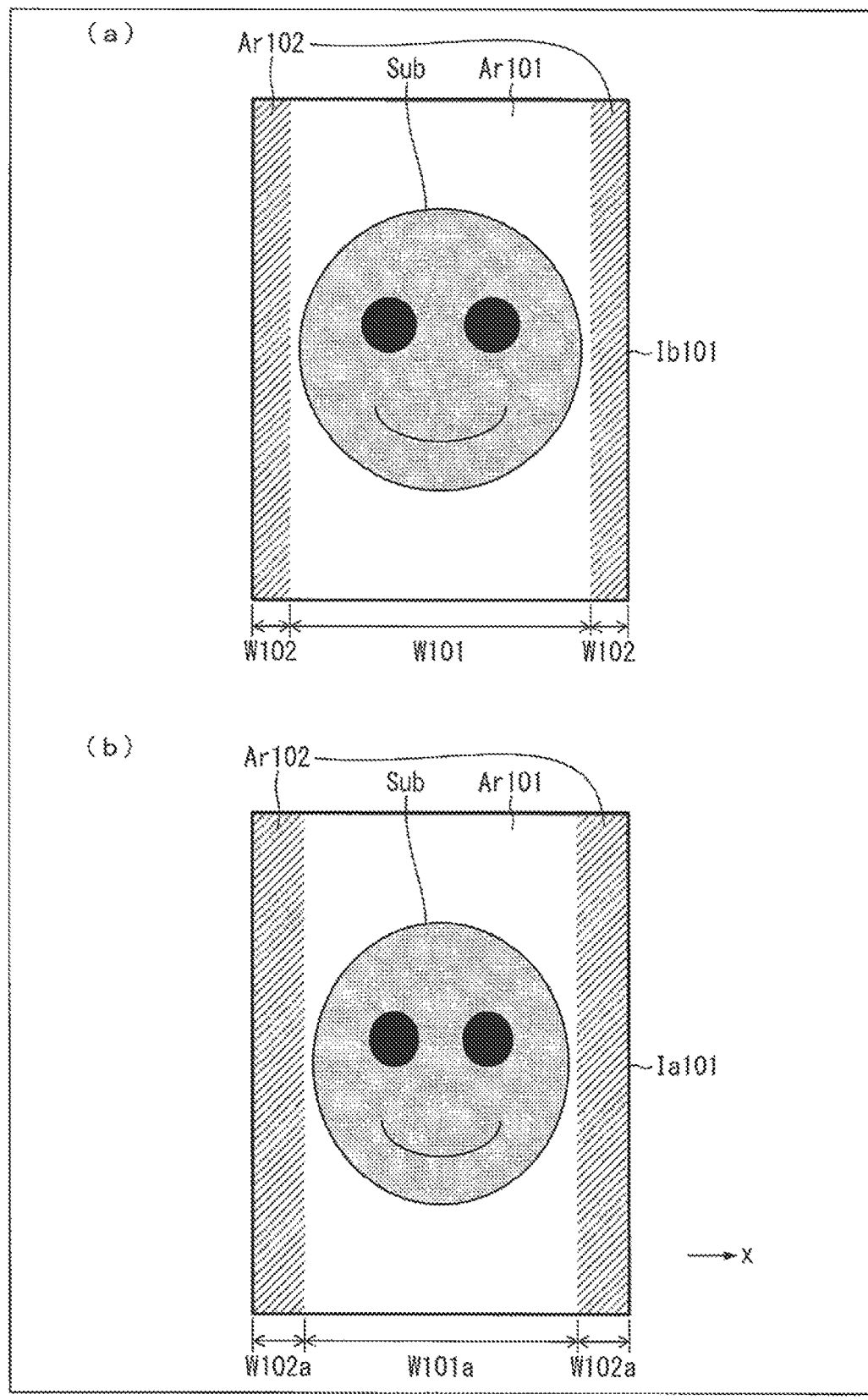
FIGS 14(a) and 14(b) are diagrams illustrating a disadvantage of image correction processing executed by the conventional image processing device, and includes FIG. 14(a) illustrating an example of an image before the correction and FIG. 14(b) illustrating an example of an image after the correction.

As illustrated in FIG. 12(*b*), a region (narrow width region) including upper left, left, lower left, downward, and lower right directions as viewed from the center Ct has the enlargement region Ar2 set in the input image Ib8 to be adjacent to the region Arn outside the angle of view. Thus, the narrow width region has a width W2*b* and a width W2*c* set to be smaller than the width W2 in a region (wide width region) including lower right, right, upward, and upper left directions as viewed from the center Ct. The width W2 of the enlargement region Ar2 in the narrow width region is referred to as the widths W2*b* and W2*c* for the sake of easier description.

Under this condition, it is assumed that the correction intensity determination unit 43 determines the first magnification and the second magnification as in the second embodiment. In the wide width region, the preset values can be directly used as the first magnification and the second magnification. On the other hand, in the narrow width region, the second magnification is determined to be the preset value, and the first magnification is determined in each direction based on the formula. As a result, the image correction unit 44 generates the output image Ia8 as illustrated in FIG. 12(*c*).

As illustrated in FIG. 12(*c*), the output image Ia8 has the face Sub reduced toward the center Ct compared with the input image Ib8. The correction intensity is determined to be the lowest on the lower side (−y axis direction) and the left side (−axis direction) of the face Sub, because the distance (width W2*b*) from the center Ct to the image end is the Shortest on these sides. On the other hand, on the lower right side and the lower left side of the face Sub, the distance from the center Ct to the image end is longer than that on the left and the tower sides of the face Sub (width W2*c*>width W2*b*). Thus, the correction intensity is set to be higher than that on the left and the lower sides of the face Sub. As a result, the image correction unit 44 generates the output image Ia8 with the face Sub having lower right and lower left portions of the face line denied (recessed) as illustrated in FIG. 12(*c*).

When the correction intensity is corrected in accordance with the distance from the center Ct to the image end, the correction intensity may largely vary among directions from the center Ct (among pixel positions in the input image Ib8) because the distance varies among the directions. Thus, the corrected face Sub in the output image Ia8 may have a shape giving an unnatural impression.

Thus, in the present embodiment, the correction intensity determination unit 43 changes the preset first and second magnifications to lower the correction intensity if there is a direction the distance in which from the center Ct to the image end is short. Specifically, the correction intensity determination unit 43 determines the corrected second magnification so that the first magnification becomes closer to 1 than the first magnification obtained by substituting the present second magnification into the formula is. In other words, the correction intensity determination unit 43 uses the corrected second magnification obtained by reducing the second magnification by a predetermined value, as the second magnification for determining the first magnification, instead of the preset second magnification. The correction intensity determination unit 43 determines the first magnification based on the corrected second magnification as well as the width W1 of the reduction region Ar1 and the width W2 of the enlargement region Ar2. The preset first magnification is also increased by a predetermined value to be changed to a corrected first magnification.

The corrected second magnification is smaller than the preset second magnification. In other words, the preset second magnification is the maximum value of the second magnification applied to the enlargement region Ar2.

The correction intensity determination unit 43 determines whether a plurality of directions from the center Ct include a direction with a distance from the center Ct to the image end being different from another direction, to determine whether there is the region Arn outside the angle of view. In other words, the correction intensity determination unit 43 determines whether the ratio between the width W2 of the enlargement region Ar2 and the width W1 of the reduction region Ar1 match the preset ratio over the entire reduction region Ar1 and enlargement region Ar2 set in the input image Ib8 by the correction region setting unit 42. For this determination, the correction intensity determination unit 43 obtains distances between the center Ct and the four image ends (on the right, left, upper, and lower sides of the input image Ib8).

In the case of FIG. 12(*b*), the four distances obtained include distances in the right and the upper side directions (the +x axis direction and the +y axis direction) that are longer than the width W1+width W2 and distances in the left and the lower side directions (the −x axis direction and the −y axis direction) that are shorter than the width W1+width W2. Thus, the correction intensity determination unit 43 determines that there is the region Arn. The correction intensity determination unit 43 determines the shorter one of the distances from the center Ct to the image ends on the left and the tower sides, as the shortest distance. The correction intensity determination unit 43 compares the distance (shortest distance) in the direction the distance in which to the image end is the shortest with the size of the enlargement region Ar2 (the width W1 and the width W2) including the reduction region Ar1 and the region Arn, and corrects the preset first and second magnifications based on a result of the comparison.

For example, the preset first and second magnifications are respectively assumed to be 0.9 and 1.1. These values are assumed to be the same among all the directions from the center Ct. The width W1 of the reduction region Ar1 and the width W2 of the enlargement region Ar2 (the width W2 of the portion of the enlargement region Ar2 not adjacent to the region Arn) are each assumed to be eight pixels. The distance between the center Ct to the image ends on the left and the lower sides is assumed to be 10 pixels. In other words, the width W1 of the reduction region Ar1 is eight pixels from the center Ct in the −x axis direction and the −y axis direction, and the width W2 of the enlargement region Ar2*b* set to the input image Ib8 is two pixels.

Under such a condition, the correction intensity determination unit 43 first determines the preset second magnification (fixed value, 1.1) and then obtains the first magnification as (1.0−1.1×0.20)/0.80≈0.975 using the formula, for the left and the downward directions. The distance from the center Ct to the image end is sufficiently large in the right and the upward directions (width W1=width W2=eight pixels). Thus, the correction intensity determination unit 43 determines preset values (0.9 and 1.1) to be directly used as the first magnification and the second magnification in such directions.

In such a case, where is a difference of 0.075 between the first magnification (0.975) in the left and the downward directions the distance in which is the shortest, and the first magnification (0.9) in the right and the upward directions the distance in which is the longest. This difference of 0.075 may result in a possibility of generating the output image Ia8 giving an unnatural impression as illustrated in FIG. 12(c).

The correction intensity determination unit 43 determines the corrected second magnification when a difference between the first magnification obtained and the preset first magnification (the reference magnification which is 0.9 in this example) is equal to or larger than a threshold. The threshold may be set to be a value, which is 0.05 for example, determined not to lead to the generation of the output image giving an unnatural impression such as the output image Ia8.

In the case of FIG. 12, the correction intensity determination unit 43 determines that the difference is equal to or larger than the threshold, and thus reduces the preset second magnification by a predetermined value. For example, the second magnification is reduced from 1.1 to 1.05 so that the correct on rate (enlargement rate) is halved. At the same time, the correction intensity determination unit 43 increases the first magnification by the predetermined value, that is, from 0.9 to 0.95 for example. This predetermined value may also be set based on experiences to be a value with which the output image Ia8' without unnaturalness as illustrated in FIG. 12(d) is generated.

Under the conditions that the second magnification (corrected second magnification) is 1.05 and the first magnification (reference magnification after the correction (corrected first magnification)) is 0.95, the correction intensity determination unit 43 obtains the first magnification as $(1.0-1.05\times0.20)/0.80\approx0.9875$. On the other hand, for the right and the upward directions, the correction intensity determination unit 43 determines the corrected first magnification and the corrected second magnification (0.95 and 1.05) to directly be the first magnification and the second magnification.

In this case, the difference between the first magnification (0.9875) in the left and the downward directions the distance in which is the shortest and the first magnification (0.95) (reference magnification) in the right and the upward directions the distance in which is the longest is 0.0375 which is smaller than the threshold. Thus, the correction intensity determination unit 43 obtains the first magnification by using the formula, with the second magnification set to be 1.05 for directions other than the left or the downward direction in the narrow width region. The correction intensity determination unit 43 determines the corrected first magnification (0.95) and the corrected second magnification (1.05) to be the first magnification and the second magnification respectively for the wide width region.

The image correction unit 44 uses the first magnification and the second magnification determined by the correction intensity determination unit 43 to reduce and enlarge the input image Ib8 illustrated in FIG. 12(a). Thus, the image correction unit 44 can generate the output image Ia8' with small unnaturalness due to the reduced variation in the first magnification and the second magnification among the correction directions as illustrated in FIG. 12(d).

Specifically, comparison between the output image Ia8' illustrated in FIG. 12(d) and the output image Ia8 illustrated in FIG. 12(c) indicates that the output image Ia8' has a recess on the lower left and lower right face lines of the face Sub formed in the output image Ia8 reduces so that a more natural face Sub is obtained after the correction.

With the corrected second magnification thus used, the reduction width of a portion (on the lower left side and the lower right side of the face Sub in FIGS. 12(a) and 12(b) with a relatively large reduction width can be made smaller than that in the case where the first magnification is determined using the preset second magnification. Thus, the variation in the reduction width among the positions in the input image Ib8 due to the variation in the first magnification and the second magnification among the positions in the input image Ib8. Thus, the image correction unit 44 cab generate more natural output image Ia8' with the unnaturalness suppressed.

Also in a case where the distance from the center line CL of the reduction region Ar1 is defined as the width W1 of the reduction region Ar1 and the width W2 of the enlargement region Ar2, the first magnification and the second magnification as described above can be applied.

Flow of Processing Executed by Control Unit

Next, a flow of the processing executed by the control unit 40 according to the present embodiment will be described. FIG. 13 is a flowchart illustrating a flow of the processing executed by the control unit 40. The processing in S1 to S6 is the same as that described with reference to FIG. 6 and thus the description thereof is omitted herein.

Upon determining the first magnification and the second magnification in S4, the correction intensity determination unit 43 obtains the difference between the smallest one of the first magnifications obtained and the preset first magnification (reference magnification) to determine the whether the difference is equal to or larger than the threshold (S11). In the example of FIG. 12 described above, the smallest first magnification is in the left and downward directions, and the reference magnification is in the right and the upward directions.

When the result of the determination in S11 is YES, the correction intensity determination unit 43 obtains the corrected second magnification as a result of reducing the preset second magnification by the redetermined value (S12), and determines the first magnification by using the corrected second magnification (S13). In the example of FIGS. 12(a) to 12(d), the correction intensity determination unit 43 obtains the first magnification by substituting the corrected second magnification into the formula, for the narrow width region.

In S12, the correction intensity determination unit 43 obtains the corrected first magnification as a result of increasing the preset first magnification by the predetermined value. For the wide width region, this corrected first magnification is used. The corrected first magnification is set to be used as the reference magnification used in S11, each time the corrected first magnification is obtained.

Then, the processing returns to S11, where whether the difference between the first magnification obtained in S13 and the corrected first magnification (reference magnification) is equal to or larger than the threshold, and the processing proceeds to S5 when the difference is smaller than the threshold. The processing in S12 and S13 is executed again when the difference is equal to or larger than the threshold.

The processing may transition to S5, when the determination in S11 is executed for a predetermined times or more.

The processing may be executed as follows. In S4, the correction intensity determination unit 43 obtains the first magnification in the direction achieving the longest distance in distances from the center Ct to pixel ends in predetermined directions (up, down, left, and right, for example) and the first magnification in the direction achieving the shortest distance. In S11, whether the difference between these first magnifications is equal to or larger than a threshold is determined. When the result of the determination in S11 is YES, the first magnifications in these two directions are obtained again in S13. When the result of the determination in S11 is NO, the first magnifications in all the directions are obtained, and the image correction unit 44 corrects the input image Ib8 in S3.

Others

In the example described above, the predetermined value for reducing the preset second magnification (or increasing the preset second magnification) is set to halve the correction rate. However, this should not be construed in a limiting sense, and the predetermined value may be changes as appropriate in accordance with the sizes of the preset first and second magnifications, the positions of the reduction region Ar1 and the enlargement region Ar2 in the input image, and the like. Thus, the image correction unit 44 can generate the output image Ia8' without unnaturalness, regardless of the scene shown by the output image Ia8, the condition regarding the input image Ib8 (the position of the face Sub as the correction target for example), or the like.

The difference in the correction intensity among the correction directions might be more noticeable with a higher preset correction intensity (with the first magnification more reduced and the second magnification more increased). For example, as in the output image Ia8 illustrated in FIG. 12(c), recesses in the predetermined directions might be very noticeable. The difference might be noticeable when the region Arn outside the angle of view in the direction with the shortest distance from the center Ct to the image end is large.

In such a case, the difference can be reduced by setting a larger predetermined value (correction coefficient) for achieving a larger variation in the correction intensity. Thus, the image correction unit 44 can generate the output image Ia8' with the unnaturalness due to the recess (distortion of the face line) and the like reduced.

On the other hand, the difference is reduced with a lower preset correction intensity (with the first magnification and the second magnification being closer to 1). The difference may be small, when the region Arn outside the angle of view in the direction with the shortest distance from the center Ct to the image end.

In such a case, the difference can further be reduced with the predetermined value (correction coefficient) set to be a smaller value to reduce the variation in the correction intensity. Thus, the reduction region Ar1 and the enlargement region Ar2 can be reduced and enlarged with values close to the preset first and second magnifications. In other words, in the output image Ia8', and effect similar to that obtained by the correction using the preset first and second magnifications can be obtained.

Implementation Examples by Software

The control blocks (especially the subject detection unit 41, the correction region setting unit 42, the correction intensity determination unit 43, and the image correction unit 44 of the control unit 40) of the image printing apparatus 1 may be achieved with a logic circuit (hardware) formed as an integrated circuit (IC chip) or the like, or with software using a Central Processing Unit (CPU).

In the latter case, the image printing apparatus 1 includes a CPU configured to perform commands of a program being software for achieving the functions, a Read Only Memory (ROM) or a storage device (these are referred to as "recording medium") in which the program and various pieces of data are recorded in a computer- (or CPU-) readable manner, and a Random Access Memory (RAM) in which the program is loaded. The computer (or CPU) reads from the recording medium and performs the program to achieve the subject of the present disclosure. As the above-described recording medium, a "non-transitory tangible medium" such as a tape, a disk, a card, a semiconductor memory, and a programmable logic circuit can be used. The above-described program may be supplied to the above-described computer via an arbitrary transmission medium (such as a communication network and a broadcast wave) capable of transmitting the program. Note that one aspect of the present disclosure may also be implemented in a form of a data signal embedded in a carrier wave in which the program is embodied by electronic transmission.

Supplement

An image processing device (control unit 40) according to a first aspect of the present disclosure includes:

a target region detection unit (subject detection unit 41) that detects a target region (a face Sub as a subject) in an image (input image Ib1 to Ib8);

a magnification determination unit (correction intensity determination unit 43) that determines a first magnification for reducing a first region (reduction region Ar1) including the target region in the image and a second magnification for enlarging a second region (enlargement region Ar2) on an outer side of the first region; and an image correction unit (44) that reduces the first region by using the first magnification and enlarges the second region by using the second magnification to correct the image, wherein the magnification determination unit determines the first magnification based on the second magnification and widths (W1, W2, W2a, W2A', W2b, W2c) of the first region and the second region in the image.

For example, when an image is corrected by using a method (conventional method) of determining a second magnification with a preset second magnification as a reference, a smaller second region relative to a first region in the image results in the second magnification calculated to be larger, thus, with this conventional method, when the target region is positioned close to an image end for example, an image that is partially enlarged unnaturally might be generated as the image after processing (output image). Thus, with the conventional method, the image quality might be degraded as a result of the image processing.

In view of this, with the configuration of the first aspect described above, the first magnification for reducing the first region including the target region is determined based on the second magnification for enlarging the second region and the widths of the first region and the second region. In other words, the first magnification is determined with the second magnification as the reference, and thus the magnification to be the reference is switched from that in the conventional method. Thus, a risk of the degradation of the image quality as described above can be reduced. In other words, the configuration according to the first aspect can suppress the degradation of the image quality due to the image processing.

In the image processing device according to a second aspect of the present disclosure, in the first aspect, the magnification determination unit may obtain the first magnification based on {1−(the second magnification)×(a ratio of the width of the second region in a predetermined direction from a predetermined position (the center line CL, center Ct) in the first region to a reference width (Wb) from the predetermined position to an end portion (P1) of the second region)}/(a ratio of the width of the first region in the predetermined direction from the predetermined position to the reference width).

With this configuration, the first magnification is calculated based on the formula. Thus, the aspect ratio can be substantially maintained between images before and after the processing even when the target region is positioned close to the image end, whereby the suppression of the degradation of the image quality due to the image processing can be guaranteed.

In the image processing device according to a third aspect of the present disclosure, in the first or the second aspect, the first region and the second region may each be a rectangular region having predetermined widths in the image, and the magnification determination unit may determine the first magnification by using the predetermined widths as widths of first region and the second region in the image.

With this configuration, even when the image includes the first and the second regions that are each a rectangular region with a predetermined width, the first magnification can be determined based on the second magnification and the predetermined width in the first and the second regions.

In the image processing device according to a fourth aspect of the present disclosure, in the first or the second aspect, the first region and the second region may each be a region expanding about a center (Ct) or a center line (CL) of the target region in the image, and the magnification determination unit may determine for each of straight lines extending in a plurality of direction from the center or the center line of the first region, the first magnification for reducing the first region on the straight line.

With this configuration, even when the image includes the first region and the second region that are each a region expanding about the center or the center line of the target region in the image, the first magnification can be determined based on the second magnification and the widths of the first and the second regions.

In the image processing device according to a fifth aspect of the present disclosure, in the fourth aspect, the magnification determination unit may use a corrected second magnification as a result of reducing the second magnification by a predetermined value, as the second magnification for determining the first magnification.

With this configuration, the first magnification can be determined again by using the corrected second magnification obtained by reducing the second magnification by a predetermined amount.

For example, when the first magnification that varies among at least part of a plurality of directions from the center or the center line is determined, an unnatural image might be generated if a difference between the first magnification for one direction and the first magnification for another direction is at a certain level (if the difference is equal to or larger than a threshold for example).

The image processing device according to the fifth aspect determines the first magnification by using the corrected second magnification as described above, where by the difference can be made small. Thus, the image processing device involves a lower risk of generating an unnatural image.

In the image processing device according to a sixth aspect of the present disclosure, in any one of the first to the fifth aspects, the magnification determination unit may determine, when a ratio between a width of the first region and a second width of the second region in a predetermined direction from a predetermined position in the first region matches a preset ratio between the width of the first region and the width of the second region, preset first and second magnifications respectively as a first magnification for reducing the first region on a straight line extending from the predetermined position to the predetermined direction and a second magnification for enlarging the second region on the straight line.

With the configuration described above, the first magnification may not necessarily be determined based on the second magnification and the widths of the first and the second regions (by using the formula for example) under the condition described above. Thus, the image can be appropriately corrected with simple processing.

An image processing device (control unit 40) according to a seventh aspect of the present disclosure includes:

a target region detection unit (subject detection unit 41) that detects a target region (a face Sub as a subject) in an image (input image Ib1 to Ib8).

a magnification determination unit (correction intensity determination unit 43) that determines a first magnification for reducing a first region (reduction region Ar1); and an image correction unit (44) that reduces the first region by using the first magnification and enlarges a second region (enlargement region Ar2) on an outer side of the first region by using a preset second magnification for enlarging the second region to correct the image, wherein the magnification determination unit determines the first magnification based on the widths (W1, W2, W2a, W2A', W2b, W2c) of the first region and the second region in the image.

With this configuration, the first magnification is determines based on the widths of the first and the second regions. The first region is reduced by using the determined first magnification, and the second region is enlarged by using the preset second magnification. This processing according to the seventh aspect is different from the conventional method in which a predetermined value is used as the first magnification and the second magnification is determined based on the first magnification. Thus, the degradation of the image quality due to the image processing that may occur with the conventional method, can be suppressed with the configuration according to the seventh aspect.

An imaging apparatus (image printing apparatus 1) according to an eighth aspect of the present disclosure includes: an imaging unit 10); and the image processing device according to any one of first to the seventh aspects that executes image processing on the image including the target region captured by the imaging unit.

With this configuration, the degradation of the image quality due to the image processing on the image captured by the imaging unit can be suppressed.

An image printing apparatus (1) according to a ninth aspect of the present disclosure includes the image processing apparatus according to any one of the first to the seventh aspects and a printing unit (50) that prints an image (output image Ia3', Ia4, Ia5, Ia7, Ia8, and Ia8') as a result of image processing executed by the image processing device.

With this configuration, the degradation of the image quality of the printed image can be suppressed.

An image printing apparatus (1) according to a tenth aspect of the present disclosure includes: an imaging unit (10); the image processing apparatus according to any one of the first to the seventh aspects that executes image processing on the image including the target region captured by the imaging unit; and a printing unit (50) that prints an image (output image Ia3', Ia4, Ia5, Ia7, Ia8, and Ia8') as a result of image processing executed by the image processing device.

With this configuration, the degradation of the image quality of the printed image can be suppressed.

A control method of an image processing device according to an 11th aspect of the present disclosure includes:

a target region defection step (S2) of detecting a target region in an image;

a magnification determination step (S4) of determining a first magnification for reducing a first region including the target legion in the image and a second magnification for enlarging a second region on an outer side of the first region; and an image correction step (S5) of reducing the first region by using the first magnification and enlarges the second region by using the second magnification to correct the image, wherein the magnification determination step includes determining the first magnification based on the second magnification and widths of the first region and the second region in the image.

According to the above method, an effect is exerted similarly to the image processing device according to the first aspect described above.

The image processing device according to each of the aspects of the present disclosure may be implemented by a computer. In this case, a control program of the image processing device configured to cause a computer to operate as each unit (software component) included in the image processing device to implement the image processing device by the computer and a computer-readable recording medium configured to record the control program are also included in the scope of the present disclosure.

Supplemental Note

The present disclosure is not limited to each of the above-described embodiments. It is possible to make various modifications within the scope of the claims. An embodiment obtained by appropriately combining technical elements each disclosed in different embodiments falls also within the technical disclosure. Further, when technical elements disclosed in the respective embodiments are combined, it is possible to form a new technical feature.

CROSS-REFERENCE TO RELATED APPLICATION

This international application claims priority to JP 2016-253887, filed on Dec. 27, 2016, and the total contents thereof are hereby incorporated by reference.

REFERENCE SIGNS LIST

1 Image processing device (imaging device)
10 Imaging unit
40 Control unit (image processing device)
41 Subject detection unit (target region detection unit)
43 Correction intensity determination unit
44 Image correction unit
50 Printing unit
Ar1 reduction region (first region)
Ar2 Enlargement region (second region)
CL center line (predetermined position)
Ct Center (predetermined position)
Ia3', Ia4, Ia5, Ia7, Ia8, Ia8' Output image (image)
Ib1 to Ib8 Input image (image)
P1 End portion
Sub Face (target region)
W1, W2, W2a, W2a', W2b, W2c Width
Wb Reference width

The invention claimed is:

1. An image processing device comprising:
a target region detection circuit that detects a target region in an image;
a magnification determination circuit that determines a first magnification for reducing a first region including the target region in the image and a second magnification for enlarging a second region on an outer side of the first region; and
an image correction circuit that reduces the first region by using the first magnification and enlarges the second region by using the second magnification to correct the image, wherein
the magnification determination circuit determines the first magnification based on the second magnification and widths of the first region and the second region in the image.

2. The image processing device according to claim 1, wherein
the magnification determination circuit obtains the first magnification based on {1−(the second magnification)×(a ratio of the width of the second region in a predetermined direction from a predetermined position in the first region to a reference width from the predetermined position to an end portion of the second region)}/(a ratio of the width of the first region in the predetermined direction from the predetermined position to the reference width).

3. The image processing device according to claim 1, wherein
the first region and the second region are each a rectangular region having predetermined widths in the image, and
the magnification determination circuit determines the first magnification by using the predetermined widths as widths of the first region and the second region in the image.

4. The image processing device according to claim 1, wherein
the first region and the second region are each a region expanding about a center or a center line of the target region in the image, and
the magnification determination circuit determines for each of straight lines extending in a plurality of direction from the center or the center line of the first region, the first magnification for reducing the first region on the straight line.

5. The image processing device according to claim 4, wherein
the magnification determination circuit uses a corrected second magnification as a result of reducing the second magnification by a predetermined value, as the second magnification for determining the first magnification.

6. The image processing device according to claim 1, wherein
the magnification determination circuit determines, when a ratio between a width of the first region and a width of the second region in a predetermined direction from a predetermined position in the first region matches a preset ratio between the width of the first region and the width of the second region, preset first and second magnifications respectively as the first magnification for reducing the first region on a straight line extending from the predetermined position to the predetermined direction and the second magnification for enlarging the second region on the straight line.

7. An imaging apparatus comprising:
an imaging unit; and
the image processing device according to claim 1 that executes image processing on the image including the target region captured by the imaging unit.

8. An image printing apparatus comprising:
the image processing device according to claim 1; and
a printing unit that prints an image as a result of image processing executed by the image processing device.

9. An image printing apparatus comprising:
an imaging unit;
the image processing device according to claim 1 that executes image processing on the image including the target region captured by the imaging unit; and
a printing unit that prints an image as a result of image processing executed by the image processing device.

10. An image processing device comprising:
a target region detection circuit that detects a target region in an image;
a magnification determination circuit that determines a first magnification for reducing a first region including the target region in the image; and
an image correction circuit that reduces the first region by using the first magnification and enlarges a second region on an outer side of the first region by using a predetermined second magnification for enlarging the second region, wherein
the magnification determination circuit determines the first magnification based on the widths of the first region and the second region in the image.

11. A control method of an image processing device, the method comprising:
a target region detection step of detecting a target region in an image;
a magnification determination step of determining a first magnification for reducing a first region including the target region in the image and a second magnification for enlarging a second region on an outer side of the first region; and
an image correction step of reducing the first region by using the first magnification and enlarges the second region by using the second magnification to correct the image, wherein
the magnification determination step includes determining the first magnification based on the second magnification and widths of the first region and the second region in the image.

12. A non-transitory recording medium for storing a program configured to cause a computer to perform:
detecting, as a target region detection unit, a target region in an image;
determining, as a magnification determination unit, a first magnification for reducing a first region including the target region in the image and a second magnification for enlarging a second region on an outer side of the first region; and
correcting the image, as an image correction unit, by reducing the first region by using the first magnification and enlarging the second region by using the second magnification, wherein
the magnification determination unit determines the first magnification based on the second magnification and widths of the first region and the second region in the image.

* * * * *